US011265887B2

(12) United States Patent
Xue et al.

(10) Patent No.: US 11,265,887 B2
(45) Date of Patent: Mar. 1, 2022

(54) MEASUREMENT REPORT ON USER EQUIPMENT CLEAR CHANNEL ASSESSMENT STATUS

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Jing Sun, San Diego, CA (US); Yongbin Wei, La Jolla, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/566,566

(22) Filed: Sep. 10, 2019

(65) Prior Publication Data
US 2020/0107335 A1 Apr. 2, 2020

Related U.S. Application Data

(60) Provisional application No. 62/738,215, filed on Sep. 28, 2018.

(51) Int. Cl.
*H04W 72/12* (2009.01)
*H04W 76/27* (2018.01)
*H04W 24/10* (2009.01)

(52) U.S. Cl.
CPC .......... *H04W 72/12* (2013.01); *H04W 24/10* (2013.01); *H04W 76/27* (2018.02)

(58) Field of Classification Search
CPC ...... H04W 72/12; H04W 76/27; H04W 24/10

USPC ........................................................ 370/329
See application file for complete search history.

(56) References Cited

U.S. PATENT DOCUMENTS

| 2017/0013479 | A1* | 1/2017 | Sun ...................... H04W 24/08 |
| 2017/0099667 | A1* | 4/2017 | Dinan ................... H04L 5/0053 |
| 2018/0048498 | A1* | 2/2018 | Stern-Berkowitz ......................... H04L 5/0048 |
| 2018/0092043 | A1 | 3/2018 | Yerramalli et al. |

FOREIGN PATENT DOCUMENTS

| WO | WO-2017007579 A1 | 1/2017 |
| WO | WO-2017026984 A1 * | 2/2017 ............ H04W 16/14 |

OTHER PUBLICATIONS

International Search Report and Written Opinion—PCT/US2019/050533—ISA/EPO—dated Nov. 25, 2019.

* cited by examiner

*Primary Examiner* — Yemane Mesfin
*Assistant Examiner* — Intekhaab A Siddiquee
(74) *Attorney, Agent, or Firm* — Liem T. Do

(57) ABSTRACT

Methods, systems, and devices for wireless communications are described. A user equipment (UE) may determine that a serving base station of the UE has obtained access to a wireless channel of a shared radio frequency spectrum band during a transmission opportunity that is separate from a scheduled uplink transmission by the UE. The UE may perform, based at least in part on the determination, a clear channel assessment (CCA) procedure on the wireless channel during a designated quiet portion of the transmission opportunity. The UE may transmit an unsolicited CCA status report to the serving base station during the transmission opportunity based at least in part on the CCA procedure.

30 Claims, 16 Drawing Sheets

Channel Access Indication

CCA Status Report

MEASUREMENT REPORT ON USER EQUIPMENT CLEAR CHANNEL ASSESSMENT STATUS

CROSS REFERENCE

The present application for patent claims the benefit of U.S. Provisional Patent Application No. 62/738,215 by XUE, et al., entitled "MEASUREMENT REPORT ON USER EQUIPMENT CLEAR CHANNEL ASSESSMENT STATUS," filed Sep. 28, 2018, assigned to the assignee hereof, and expressly incorporated herein.

BACKGROUND

The following relates generally to wireless communications, and more specifically to measurement report on user equipment (UE) clear channel assessment (CCA) status.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UE.

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Certain wireless communication systems may operate in a shared or unlicensed radio frequency spectrum band. For example, the base station and/or UE may perform a listen-before-talk (LBT) procedure, clear channel assessment (CCA) procedure, and the like, on channel(s) in order to capture the medium for a transmission. When the CCA procedure is unsuccessful, e.g., the channel(s) is/are busy, energy is detected on the channel, and the like, the base station and/or UE may perform a backoff procedure where the device waits before attempting to capture the medium again to perform the transmission. When the CCA procedure is successful, e.g., the channel(s) is/are not busy, little or no energy is detected on the channel, and like, the base station and/or UE may be considered to have capture the channel to perform wireless communications.

Conventional techniques, however, do not provide an adequate mechanism for a base station to track channel conditions at a UE for periods during which the UE is not scheduled to communicate with the base station. For example, conventional techniques are typically limited to the UE performing a CCA procedure or reporting channel measurements to a base station only when the UE needs to capture the channel for a scheduled wireless communication. In some aspects, this may provide an incomplete picture for the base station, a UE, and/or the network, to consider when monitoring the performance of the channel, when making decisions with respect to a handover that the UE to a new cell, and the like. Generally, the handover can be particularly problematic when the devices are operating in the shared or unlicensed radio frequency spectrum band. Aspects of the described techniques provide a mechanism to leverage the results of the CCA procedure performed by a UE operating in such a shared or unlicensed radio frequency spectrum band.

SUMMARY

The described techniques relate to improved methods, systems, devices, and apparatuses that support measurement report on user equipment (UE) clear channel assessment (CCA) status. Generally, the described techniques provide for a mechanism for improved awareness by the network and/or base station of the channel conditions (e.g., channel performance, handover decisions, and the like) experienced by UE. In some aspects, the described techniques define a measurement report for a UE CCA status that is condition on the serving base station obtaining access to a shared or unlicensed radio frequency spectrum band. For example, the serving base station may perform a CCA procedure, such as an enhanced CCA (eCCA) procedure and secure or otherwise obtain access to a wireless channel of the shared radio frequency spectrum band. Generally, the access to the channel may be for a transmission opportunity (TxOP) that includes one or more designated quiet portions where devices operating the channel are silent. The base station may transmit an indication to the UE (and other UEs) that access to the channel is been obtained. However, the UE may not be scheduled to perform wireless communications during the TxOP. For example, the UE may not be scheduled to perform uplink transmissions to the base station during the TxOP. Nevertheless, the UE may perform a CCA procedure on the wireless channel during one or more of the designated quiet portions configured within the TxOP. Generally, the UE may perform a category 2 (CAT-2) CCA procedure (e.g., a one-shot CCA procedure), a CAT-4 CCA procedure (e.g., a full CCA procedure), and the like. The UE may transmit an unsolicited CCA status report to the base station serving the UE that carries or otherwise conveys an indication of a result of the CCA procedure performed by the UE.

In some aspects, the base station may configure resources associated with channel based, at least in some aspects, on the unsolicited CCA status report(s). For example, the base station may use the unsolicited CCA status report(s) when determining whether channel switching is warranted, whether handover of the UE to a new serving base station is warranted, and the like. Accordingly, aspects of the described techniques provide a mechanism whereby an unscheduled UE may, based on the channel being secured or captured by the serving base station, provide an indication of the results of the CCA procedure to the base station to support improved and more timely resource configuration decisions.

A method of wireless communication at a UE is described. The method may include determining that a serving base station of the UE has obtained access to a wireless channel of a shared radio frequency spectrum band during a TxOP that is separate from a scheduled uplink transmission by the UE, performing, based on the determination, a CCA procedure on the wireless channel during a designated quiet portion of the TxOP, and transmitting an unsolicited CCA status report to the serving base station during the TxOP based on the CCA procedure.

An apparatus for wireless communication at a UE is described. The apparatus may include a processor, memory in electronic communication with the processor, and instructions stored in the memory. The instructions may be executable by the processor to cause the apparatus to determine that a serving base station of the UE has obtained access to a wireless channel of a shared radio frequency spectrum band during a TxOP that is separate from a scheduled uplink transmission by the UE, perform, based on the determination, a CCA procedure on the wireless channel during a designated quiet portion of the TxOP, and transmit an unsolicited CCA status report to the serving base station during the TxOP based on the CCA procedure.

Another apparatus for wireless communication at a UE is described. The apparatus may include means for determining that a serving base station of the UE has obtained access to a wireless channel of a shared radio frequency spectrum band during a TxOP that is separate from a scheduled uplink transmission by the UE, performing, based on the determination, a CCA procedure on the wireless channel during a designated quiet portion of the TxOP, and transmitting an unsolicited CCA status report to the serving base station during the TxOP based on the CCA procedure.

A non-transitory computer-readable medium storing code for wireless communication at a UE is described. The code may include instructions executable to determine that a serving base station of the UE has obtained access to a wireless channel of a shared radio frequency spectrum band during a TxOP that is separate from a scheduled uplink transmission by the UE, perform, based on the determination, a CCA procedure on the wireless channel during a designated quiet portion of the TxOP, and transmit an unsolicited CCA status report to the serving base station during the TxOP based on the CCA procedure.

Some examples of the method, apparatuses, and non-transitory computer-readable medium described herein may further include operations, features, means, or instructions for determining a CCA failure rate over a time period, where transmitting the unsolicited CCA status report may be based on the CCA failure rate.

Some examples of the method, apparatuses, and non-transitory computer-readable medium described herein may further include operations, features, means, or instructions for triggering the unsolicited CCA status report based on the CCA failure rate over the time period satisfying a threshold.

In some examples of the method, apparatuses, and non-transitory computer-readable medium described herein, determining that the serving base station of the UE may have obtained access to the wireless channel may include operations, features, means, or instructions for receiving from the serving base station an indication that the serving base station may have obtained access to the wireless channel.

In some examples of the method, apparatuses, and non-transitory computer-readable medium described herein, a common control signal, a radio resource control (RRC) signal, or a downlink control information signal, or a combination thereof.

Some examples of the method, apparatuses, and non-transitory computer-readable medium described herein may further include operations, features, means, or instructions for performing a handover procedure to a non-serving base station based on the unsolicited CCA status report.

Some examples of the method, apparatuses, and non-transitory computer-readable medium described herein may further include operations, features, means, or instructions for receiving from the serving base station a preamble to the TxOP, the preamble indicating the designated quiet portion of the TxOP.

Some examples of the method, apparatuses, and non-transitory computer-readable medium described herein may further include operations, features, means, or instructions for receiving a RRC message from the serving base station indicating the designated quiet portion of the TxOP.

In some examples of the method, apparatuses, and non-transitory computer-readable medium described herein, the CCA procedure may be beam-specific.

Some examples of the method, apparatuses, and non-transitory computer-readable medium described herein may further include operations, features, means, or instructions for receiving a signal from the serving base station identifying a resource set for the CCA procedure, where the resource set includes one or more of: a set of one or more resource blocks, a set of one or more frequency subcarriers associated with the channel, the channel of the shared radio frequency spectrum band, or a combination thereof.

In some examples of the method, apparatuses, and non-transitory computer-readable medium described herein, the CCA procedure includes either a category four (CAT-4) LBT procedure or a CAT-2 LBT procedure.

A method of wireless communication at a serving base station is described. The method may include transmitting an indication that the serving base station has obtained access to a wireless channel of a shared radio frequency spectrum band during a TxOP, receiving, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP, and configuring one or more resources associated with the channel based on the unsolicited CCA status report.

An apparatus for wireless communication at a serving base station is described. The apparatus may include a processor, memory in electronic communication with the processor, and instructions stored in the memory. The instructions may be executable by the processor to cause the apparatus to transmit an indication that the serving base station has obtained access to a wireless channel of a shared radio frequency spectrum band during a TxOP, receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP, and configure one or more resources associated with the channel based on the unsolicited CCA status report.

Another apparatus for wireless communication at a serving base station is described. The apparatus may include means for transmitting an indication that the serving base station has obtained access to a wireless channel of a shared radio frequency spectrum band during a TxOP, receiving, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP, and configuring one or more resources associated with the channel based on the unsolicited CCA status report.

A non-transitory computer-readable medium storing code for wireless communication at a serving base station is described. The code may include instructions executable to transmit an indication that the serving base station has obtained access to a wireless channel of a shared radio frequency spectrum band during a TxOP, receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP, and configure one or more resources associated with the channel based on the unsolicited CCA status report.

Some examples of the method, apparatuses, and non-transitory computer-readable medium described herein may further include operations, features, means, or instructions for performing channel switching based on the unsolicited CCA status report.

Some examples of the method, apparatuses, and non-transitory computer-readable medium described herein may further include operations, features, means, or instructions for determining, based on the unsolicited CCA status report, that a failure rate for a set of CCA procedures performed by the UE satisfies a threshold level, where the channel switching may be performed based on the failure rate satisfying the threshold level.

In some examples of the method, apparatuses, and non-transitory computer-readable medium described herein, a common control signal, a RRC signal, a downlink control information signal, or a combination thereof.

In some examples of the method, apparatuses, and non-transitory computer-readable medium described herein, the CCA procedure may be beam-specific.

Some examples of the method, apparatuses, and non-transitory computer-readable medium described herein may further include operations, features, means, or instructions for transmitting to the UE an indication of a resource set for the CCA procedure, where the resource set includes one or more of: a set of one or more resource blocks, or a set of one or more frequency subcarriers associated with the channel, or the channel of the shared radio frequency spectrum band, or a combination thereof.

In some examples of the method, apparatuses, and non-transitory computer-readable medium described herein, configuring the one or more resources associated with the channel may include operations, features, means, or instructions for scheduling a set of UEs for uplink transmissions using a same set of one or more resources based on the unsolicited CCA status report.

DETAILED DESCRIPTION

Figure 1:
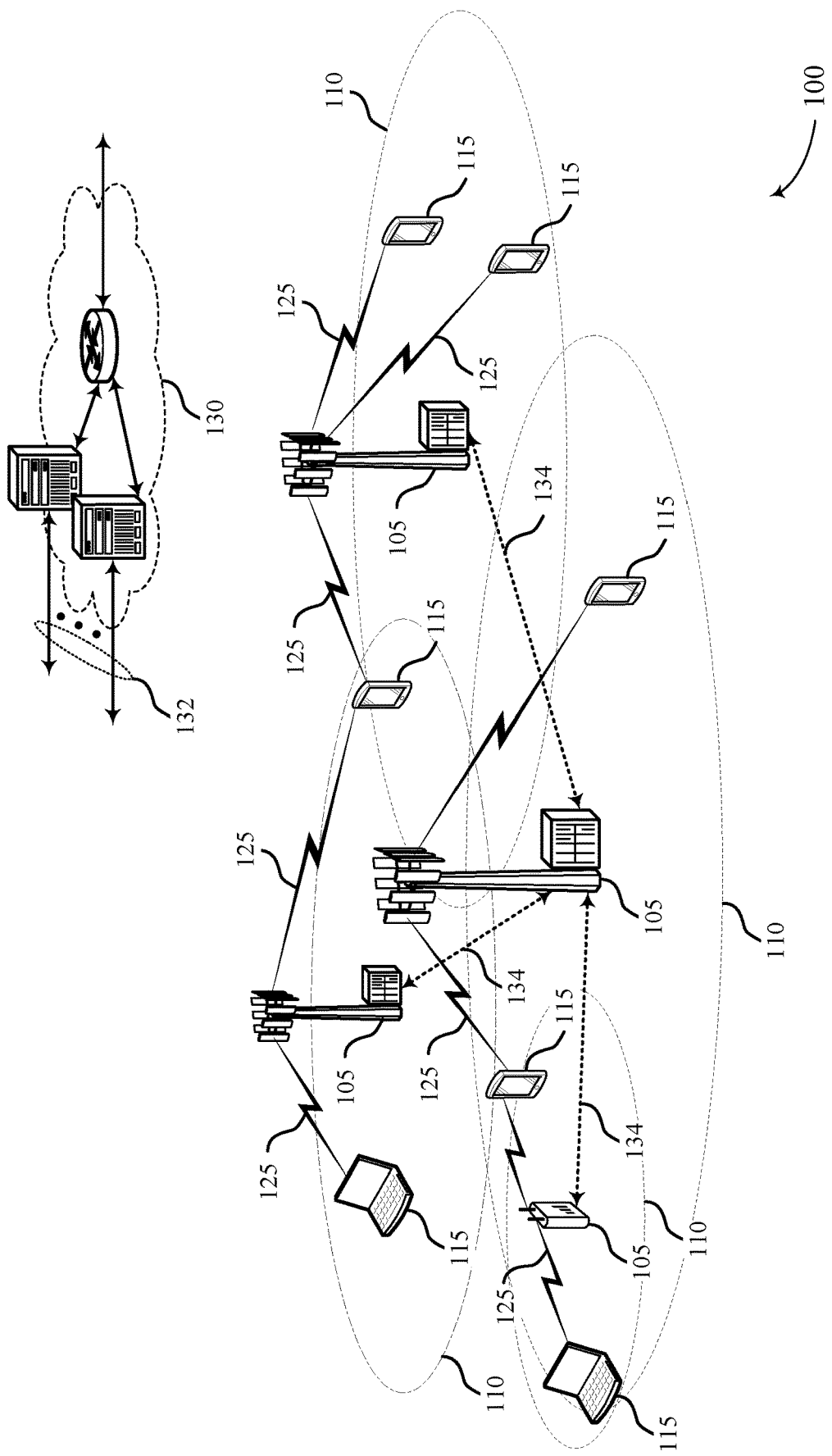
FIG. 1 illustrates an example of a system for wireless communications that supports measurement report on user equipment (UE) clear channel assessment (CCA) status in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

In some aspects, wireless communication systems may operate in a shared or unlicensed radio frequency spectrum band where the devices must perform a listen-before-talk (LBT) procedure, such as a clear channel assessment (CCA) procedure, to capture the medium or channel before performing a wireless transmission. Conventional CCA procedures, however, are inefficient and/or ineffective and may not provide suitable information that can be used by devices for making smart resource configuration decisions.

Aspects of the disclosure are initially described in the context of a wireless communication system. Broadly, the described techniques provide varying techniques for the wireless devices participating in the wireless communications to be provided a more comprehensive and timelier picture of the conditions being experienced by UEs over a channel of a shared or unlicensed radio frequency band. For example, a serving base station may perform a CCA procedure to obtain access or otherwise capture the channel of a shared or unlicensed radio frequency spectrum band. The base station may transmit or otherwise provide an indication to the UE that the base station has obtained access to the channel. In some aspects, the base station may obtain access to the wireless channel for a transmission opportunity (TxOP) in which the UE is not scheduled. Based on the UE determining that the serving base station has obtained access to the wireless channel and determine that the UE is not scheduled for communications during the TxOP, the UE may perform a CCA procedure on the wireless channel during a designated quiet portion of the TxOP. Broadly, the designated quiet portion may refer to a configured (e.g., known by devices operating on the channel) period of time within the TxOP that is configured such that each scheduled device operating on the wireless channel remain quiet (e.g., do not transmit). Accordingly, the UE may perform the CCA procedure by monitoring an energy level on the channel, for messages being exchanged on the channel, and the like.

In some aspects, the UE may transmit an unsolicited CCA status report to the serving base station that carries or otherwise conveys an indication of a result of the CCA procedure. For example, the unsolicited CCA status report may indicate whether the CCA procedure was successful or not, may indicate a number of successful or unsuccessful CCA procedures that the UE has performed within a time period, may provide an indication of one or more parameters measured on the wireless channel, and the like. The base station may generally receive the unsolicited CCA status report from the UE (and other UEs) and configure one or more resources associated with the wireless channel based on the unsolicited CCA status report(s). For example, the base station may determine whether to perform a channel switching on the channel, determine whether a handover of a UE is needed, may allocate or unallocate time and/or frequency resources, and the like. Accordingly, the unsolicited CCA status report(s) received by unscheduled UEs may provide a timely and comprehensive indication of the wireless channel performance to the base station, which may improve decision-making and resource allocation.

Aspects of the disclosure are further illustrated by and described with reference to apparatus diagrams, system diagrams, and flowcharts that relate to measurement report on UE CCA status.

FIG. 1 illustrates an example of a wireless communications system 100 that supports measurement report on UE CCA status in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transformation-spread OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may determine that a serving base station 105 of the UE 115 has obtained access to a wireless channel of a shared radio frequency spectrum band during a TxOP that is separate from a scheduled uplink transmission by the UE 115. The UE 115 may perform, based at least in part on the determination, a CCA procedure on the wireless channel during a designated quiet portion of the TxOP. The UE 115 may transmit an unsolicited CCA status report to the serving base station 105 during the TxOP based at least in part on the CCA procedure.

In some aspects, a base station 105 may transmit an indication that the serving base station (e.g., base station 105) has obtained access to a wireless channel of a shared radio frequency spectrum band during a TxOP. The base station 105 may receive, from a UE 115 during the TxOP that is separate from a scheduled uplink transmission by the UE 115, an unsolicited CCA status report, the unsolicited CCA status report indicating a result of a CCA procedure performed by the UE 115 on the wireless channel during a designated quiet portion of the TxOP. The base station 105 may configure one or more resources associated with the channel based at least in part on the unsolicited CCA status report.

Figure 2:
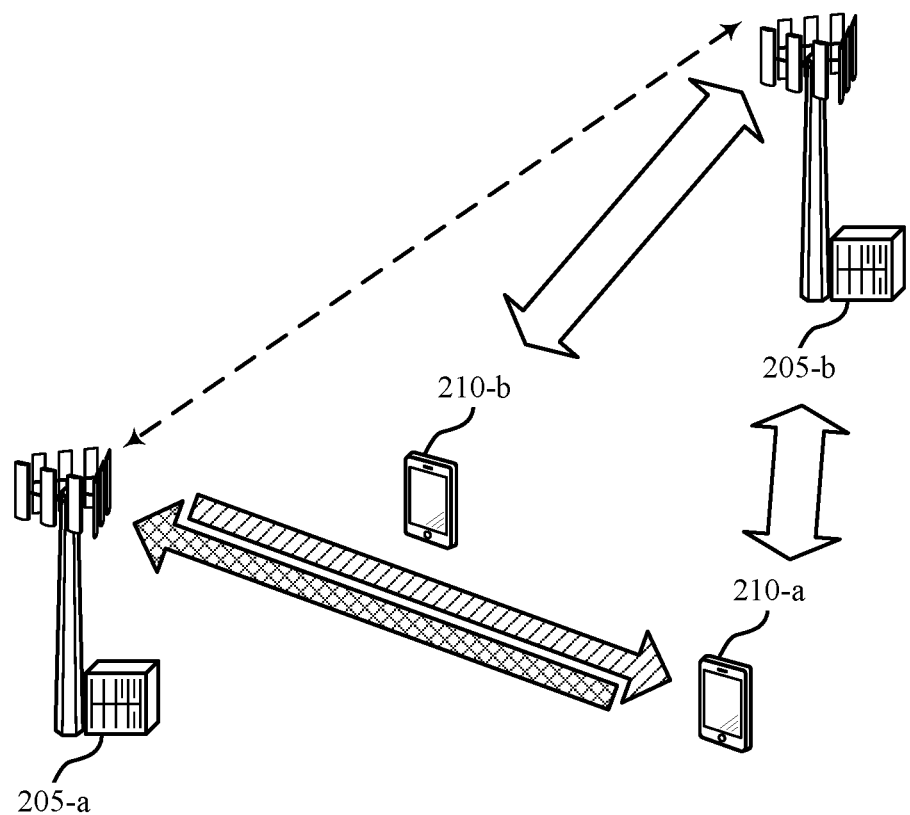
FIG. 2 illustrates an example of a wireless communication system that supports measurement report on UE CCA status in accordance with aspects of the present disclosure.
Figure 2:
Figure 2:

FIG. 2 illustrates an example of a wireless communication system 200 that supports measurement report on UE CCA status in accordance with aspects of the present disclosure. In some examples, wireless communication system 200 may implement aspects of wireless communication system 100. Aspects of wireless communication system 200 may include base stations 205 and UEs 210, which may be examples of the corresponding devices described herein. In some examples, wireless communication system 200 may be a mmW network.

Generally, wireless communication system 200 may include wireless communications (e.g., uplink and/or downlink transmissions) between base stations 205 and UEs 210. For example, base station 205-*a* may be considered a serving base station from the perspective of UE 210-*a* and base station 205-*b* may be considered a serving base station from the perspective of UE 210-*b*. Base station 205-*b* may be considered a neighbor base station from the perspective of UE 210-*a* and base station 205-*a* may be considered a neighbor base station from the perspective of UE 210-*b*. That is, base station 205-*a* and UE 210-*a* may generally perform uplink and/or downlink transmissions over a wireless channel. Similarly, base station 205-*b* and UE 210-*b* may generally perform uplink and/or downlink transmissions over a wireless channel. In another example, UEs 210-*a* and 210-*b* may be associated with a base station 205-*a* (e.g., a serving base station), with base station 205-*b* being considered a neighboring base station from the perspective of UEs 210.

In some aspects, one or more of the devices of wireless communication system 200 may introduce interference on a wireless channel. For example, base station 205-*b* and UE 210-*b* may be performing wireless transmissions that, at least to some degree, interfere with transmissions between base station 205-*a* and UE 210-*a*, or vice versa. That is, in the situation base station 205-*a* is a serving base station for UE 210-*a*, but not UE 210-*b*, communications between base station 205-*b* and UE 210-*b* may interfere with communications between base station 205-*a* and UE 210-*a*, and vice versa.

Accordingly, base station 205-*a* may generally schedule wireless communications with UE 210-*a*. In some aspects, the wireless channel may be associated with an unlicensed radio frequency spectrum band, or other shared spectrum band, such that devices transmitting on the channel may perform a CCA procedure to capture the channel before transmission. In some aspects, a references to a CCA procedure may include, but are not limited to, a CAT-2 LBT procedure, a CAT-4 LBT procedure, an eCCA procedure, and the like. Generally, CCA procedures are performed by devices that are scheduled to participate in communications on a wireless channel. For example, UE 210-*a* may perform a CCA procedure before transmitting to a base station 205-*a* during the TxOP that UE 210-*a* is scheduled to perform uplink transmissions. Similarly, base station 205-*b* may perform a CCA procedure for transmitting to UE 210-*b*. Typically, the CCA procedures provide a mechanism where the wireless devices can capture the channel to perform the transmissions during the TxOP that the devices are scheduled to communicate in. However, conventional techniques do not leverage CCA procedures being performed by a non-scheduled wireless devices (e.g., during TxOP that a device is not scheduled to perform uplink or downlink transmissions). In some aspects, this may result in an unclear picture, from the network's perspective, when making decisions regarding channel usage, handover, resource allocations, and the like.

As one example, handover for proper association (e.g., association between a base station 205 the UE 210) in an unlicensed or shared radio frequency spectrum band may be more challenging than in a licensed radio frequency spectrum band. This problem may be exacerbated when targeting comparable level of quality of service (QoS) performance. For example, a handover may be needed for a stationary UE 210 when there is no substantial change in its cell when a group of co-channel devices (e.g., such as WiFi stations) enter the coverage area. In some cases the network may not have the complete picture, and, therefore, cannot take the right action when configuring resources in the absence of proper measurement reports from UEs 210. This problem may be even further exacerbated when a UE 210 CCA procedure is needed to support wireless transmissions, e.g., for a scheduled uplink transmission where UE CCA is needed, for a multi-channel LBT where the UE 210 CCA procedure could be exploited to assist a base station 205 CCA procedure on secondary channels, and the like. Conventional techniques only support the network obtaining outdated or obsolete CCA status reports from the UEs 210 after rounds of trial-and-error. However, timely information for prompt handover typically requires a new measurement report from the UE 210. Accordingly, aspects of the described techniques support a mechanism to let the network (e.g., base stations 205) know whether a UE 210 can reliably/frequently check out at the same time with its serving cell and, if not, which cell is a better cell to handover the UE 210 to.

For example, base station 205-a may capture or otherwise obtain access to a wireless channel of a shared or unlicensed radio frequency spectrum band during a TxOP. For example, base station 205-a may perform a CCA procedure on the channel and capture the channel based on the CCA procedure being successful. Generally, base station 205-a may capture the channel for a TxOP. Generally, the TxOP may be separate from a scheduled uplink transmission by UE 210-a. That is, UE 210-a may not be scheduled to perform uplink transmissions to base station 205-a during the TxOP. The TxOP may refer to a configured TxOP, a slot, a min-slot, a subframe, a frame, a sTTI, and the like.

In some aspects, the TxOP may be configured to have one or more quiet portions. For example, each wireless device communicating on the wireless channel during the TxOP may be configured to refrain from transmitting on the wireless channel during the quiet portions of the TxOP. This may provide a mechanism where any noise or signals detected on the channel could be considered interference, at least from the perspective of the devices schedule during the TxOP. For example, transmissions from UE 210-b and/or base station 205-b during the quiet portions of the TxOP may be considered interference from the perspective of base station 205-a and/or UE 210-a.

In some aspects, base station 205-a may transmit or otherwise provide an indication that it has obtained access to the wireless channel during the TxOP. For example, base station 205-a may transmit the indication to each UE 210 that it is associated with. The indication may be provided via a broadcast message, a unicast message, and/or a UE specific message. In some aspects, the indication that base station 205-a has obtained access to a wireless channel may be provided in a system information signal, in a reference signal, in a synchronization signal, in an RRC signal, in a MAC CE, a control signal, a common control signal, a downlink control information (DCI) signal, and the like. In some aspects, the indication that base station 205-a has obtained access to the wireless channel may be provided in a preamble to the TxOP. For example, the preamble to the TxOP may identify the TxOP and/or identify the designated quiet portions of the TxOP. In some aspects, an RRC message from base station 205-a may identify or otherwise provide an indication of the designated quiet portion of the TxOP. In some aspects, base station 205-a may provide the indication during some or all of the occasions in which base station 205-a obtains access to the wireless channel for a TxOP.

UE 210-a receiving the indication may determine that its serving base station 205-a has obtained access to the wireless channel. However, UE 210-a may not be scheduled for uplink transmissions during the TxOP. Nevertheless, UE 210-a may perform a CCA procedure on the wireless channel during one of the designated quiet portions of the TxOP. For example, UE 210-a may monitor an energy level on the wireless channel and/or may monitor for one or more messages being exchanged on the wireless channel during the quiet portion. As one non-limiting example, UE 210-a may monitor the channel to detect transmissions between base station 205-b and/or UE 210-b. Accordingly, UE 210-a may determine that the CCA procedure is successful if no energy/messages are detected (or no energy is detected above a threshold level) or determine that the CCA procedure is unsuccessful (e.g., a failed CCA procedure) if energy and/or messages are detected (e.g., energy is detected above a threshold level) on the wireless channel. In some aspects, UE 210-a may maintain a record of the results of the CCA procedure (as well as previously performed CCA procedures).

In some aspects, the CCA procedure may be beam-specific. For example, wireless communication system 200 may be a mmW wireless network. Accordingly, base stations 205 and/or UEs 210 may use one or more beamformed signals when performing wireless communications over the network. Accordingly, UE 210-a may perform a CCA procedure using a particular receive beam. In some aspects, the indication that base station 205-a has obtained access to the wireless channel may additionally include an indication of a direction associated with the UE 210-a performing the CCA procedure. In other aspects, UE 210-a may autonomously identify or select a receive beam (or direction) to use for the CCA procedure. In some aspects, UE 210-a may perform multiple CCA procedures (during the TxOP or across multiple TxOPs), with each CCA procedure being performed on a different receive beam.

In some aspects, base station 205-a may transmit a signal to UE 210-a that identifies or otherwise conveys an indication of the resource set to be used for the CCA procedure. For example, the resource set may include or otherwise be associated with a set of one or more resource blocks, one or more frequency subcarriers associated with the wireless channel, may identify the channel of the shared radio frequency spectrum band, and the like.

In some aspects, UE 210-a may transmit an unsolicited CCA status report to base station 210-a based at least in part on the CCA procedure. For example, one or more resources within the TxOP may be allocated or otherwise configured to allow the UEs 210 to transmit unsolicited CCA status reports to their respective serving base station 205. In some aspects, the unsolicited CCA status report may carry or otherwise convey an indication of a result of the CCA procedure performed by UE 210-a. In some aspects, the unsolicited CCA status report may carry or otherwise convey an indication of a CCA failure rate. For example, UE 210-a may maintain a record of CCA successes and/or CCA failures over a given time period. Accordingly, the unsolicited CCA status report may carry or otherwise convey an indication of the CCA failure rate over the time period. In some aspects, the unsolicited CCA status report may be triggered based on UE 210-a determining that the CCA failure rate over the time period has satisfied a threshold level. In the example where wireless communication system 200 is a mMW network, the unsolicited the CCA status report may carry or otherwise convey an indication of the receive beam (or direction) associated with CCA procedure.

In some aspects, base station 205-a may receive from UE 210-a (as well as other UEs 210 that are unscheduled for communications during the TxOP) the unsolicited CCA status report(s). Generally, base station 205-a may utilize information conveyed or indicated in the unsolicited CCA status report(s) to configure one or more resources associated with the wireless channel. For example, base station 205-a may determine the channel performance, may make one or more handover decisions, may allocate/un-allocate/reconfigure one or more resources, and the like, based on the unsolicited CCA status report(s).

For example, base station 205-a may perform channel switching based on the unsolicited CCA status report(s). In some aspects, the channel switching may be dependent upon the failure rate for a plurality of CCA procedures (as indicated in the unsolicited CCA status report(s)) performed by UE 210-a satisfying a threshold level. For example, if an excessive number of CCA procedures result in a CCA failure, this may indicate the channel switching may be necessary for UE 210-a. In some aspects, the failure rate may be based on a sliding window. For example, UE 210-a may report CCA failures (or a CCA failure rate) occurring within the defined time period to base station 205-a. In some aspects, this may include base station 205-a scheduling multiple UEs using a common set of resource(s) based on the unsolicited CCA status report(s).

In some aspects, the described techniques provide a measurement report (e.g., the unsolicited CCA status report) for a UE 210 CCA status that is conditioned on the serving cell's eCCA clear (e.g., on base station 205-a obtaining access to the wireless channel). Any configured UE 210 conducts a CCA procedure (energy detection) within the TxOP when it is not scheduled to perform uplink transmissions. The CCA procedure may be conducted at specific quite instance (e.g., downlink-to-uplink and/or uplink-to-downlink switching point, or a specific short quite period) where there is no interference from the TxOP participants. The UEs 210 may be configured for periodic reporting and/or triggered reporting of the unsolicited CCA status reports. In some aspects, the reporting that the UE CCA failure rate in a sliding window may be used. For example, the unsolicited CCA status report may be trigged if the CCA failure rate is larger than a threshold. In some aspects, the CCA procedure may be specified at some resource blocks (RBs) (e.g., not on a full bandwidth) at a given instance to conduct frequency domain CCA. The network may ensure that no TxOP participant will transmit at these RBs, e.g., may schedule zero-power channel state information reference signals (ZP-CSI-RS) for the quiet portion(s) of the TxOP. The CCA procedures may be configured on respective channels supported by the serving cell (e.g., base station 205-a). A channel specific unsolicited CCA status report may be used for reconfiguration of the primary LBT channel in multi-channel case. A cell may define a common control resource set (CORESET) to announce eCCA clear for CAT-4 LBT, or may use other physical layer signals, such as the preamble of the TxOP. The CCA procedure may be configured as a CAT-4 LBT based TxOP and/or a CAT-2 LBT based TxOP, respectively. In some aspects, the discovery reference signal (DRS) can be allowed to be based on a CAT-2 LBT.

In some aspects, the unsolicited CCA status report can be configured as being conditioned at eCCA clear of a neighboring/non-serving cell, e.g., as a handover target. For example, to be facilitated by the TxOP preamble which defines when is the right instance for the CCA procedure to be performed. As another example, it may be facilitated by a RRC signaling as the output of network coordination. In some aspects, the unsolicited CCA status report may be configured as beam-specific, e.g., when the network (or base station 205-a) conducts beam-space LBT. For example, the network may utilize sector antennas and conduct sector-based LBT. This can be used to refine the associating beam and inter-beam handover. The unsolicited CCA status report can be used for over-booking in the scheduled uplink, e.g., to schedule multiple UEs 210 on the same resource to reduce the loss due to uplink CCA failure while at the same time not introducing too many collisions. The unsolicited CCA status report may trigger the network (e.g., base station 205-a) to conduct channel switching when a considerable portion of UEs 210 reporting low CCA successful rates on current channel(s).

As discussed, in some aspects base station 205-a may make a handover decision based on the unsolicited CCA status reports. For example, base station 205-a may determine that UE 210-a would be better served with base station 205-b as the serving base station of UE 210-a. Accordingly, base station 205-a may transmit a signal to UE 210-a indicating that a handover procedure is to be performed. In response, UE 210-a may communicate with base station 205-b in order to perform the handover. Moreover, base station 205-a may communicate with base station 205-b to coordinate the handover, e.g., via backhaul or X2 communications.

Figure 3:
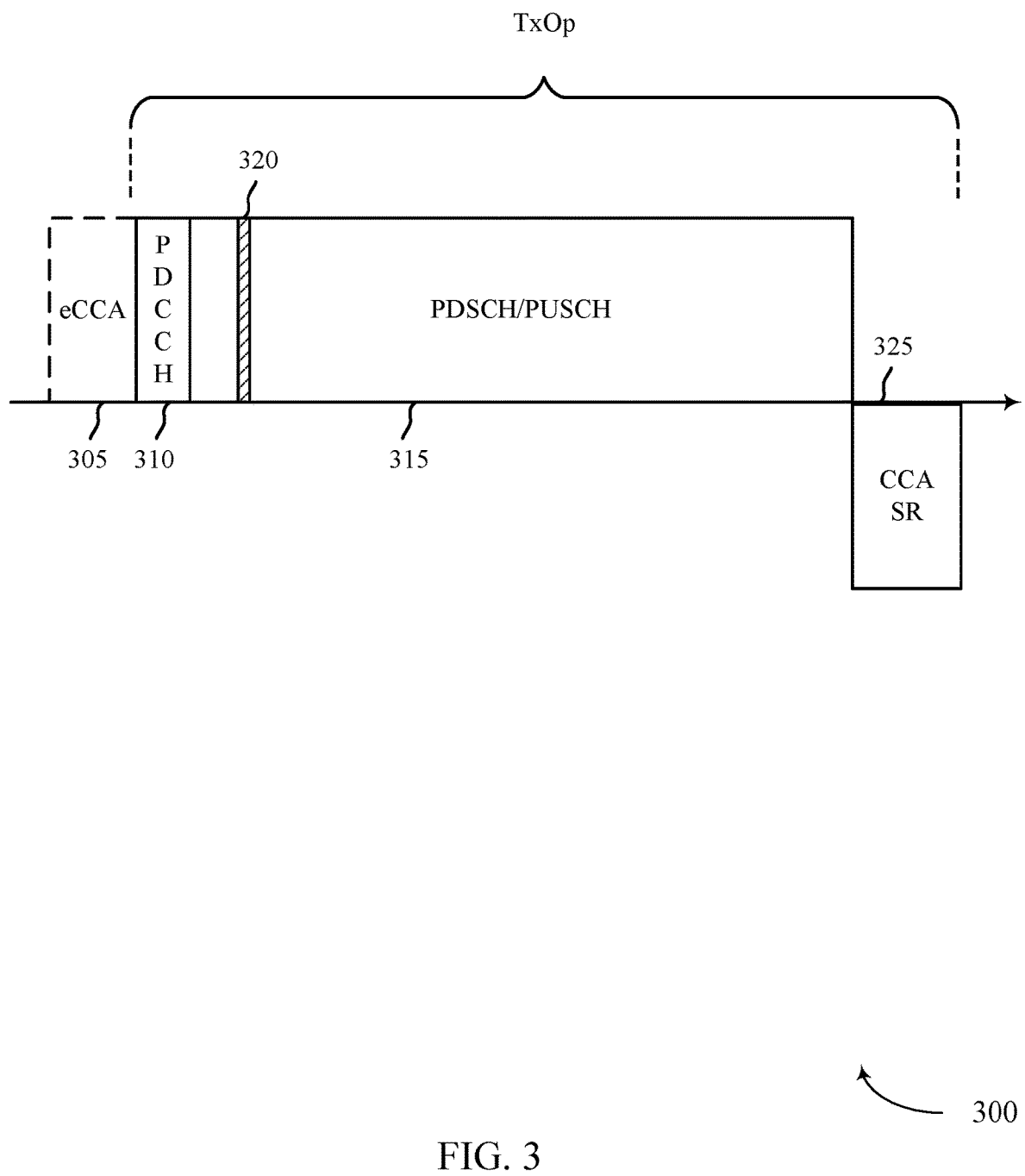
FIG. 3 illustrates an example of a timing diagram that supports measurement report on UE CCA status in accordance with aspects of the present disclosure.

FIG. 3 illustrates an example of a timing diagram 300 that supports measurement report on UE CCA status in accordance with aspects of the present disclosure. In some examples, timing diagram 300 may implement aspects of wireless communication systems 100 and/or 200. Aspects of timing diagram 300 may be implemented by a base station and/or a UE, which may be examples of corresponding devices described herein.

In some aspects, timing diagram 300 illustrates one example of a TxOP, as is described herein. For example, the TxOP may include a control portion 310 (e.g., a physical downlink control channel (PDCCH)), a data portion 315 (e.g., a physical downlink shared channel (PDSCH) and/or a physical uplink shared channel (PUSCH)), and a feedback portion 325. In some aspects, the serving base station may perform a CCA procedure during a channel access period 305 to obtain access to a wireless channel of a shared or unlicensed radio frequency spectrum band. The serving base station may transmit an indication that it has obtained access to the wireless channel during the control portion 310 (e.g., in the PDCCH signal). Additionally or alternatively, the serving base station may transmit the indication that it has obtained access to the wireless channel outside of the control portion 310, e.g., in an RRC signal, the DCI signal, and the control signal, and the like, during the data portion 315.

Generally, the TxOP may be configured with one or more quiet portion 320 (with only one quite portion 320 being shown by way of example only) in which wireless devices participating in the TxOP may refrain from transmitting on the wireless channel. Instead, unscheduled UEs (e.g., UEs that are not scheduled to perform wireless communications on the wireless channel during the TxOP) may perform a CCA procedure during the designated quiet portion 320. The CCA procedure may generally refer to an energy detection based CCA procedure and/or a message detection-based CCA procedure. In some aspects, the UEs performing the CCA procedure may transmit an unsolicited CCA status report during a feedback portion 325 to their respective serving base stations. Generally, the feedback portion 325 may be configured or otherwise allocated for UEs to transmit their unsolicited CCA status report(s). The feedback portion 325 may be considered a part of the TxOP or may be separate from the TxOP. The serving base stations may receive unsolicited CCA status report(s) during the feedback portion 325 and use this information to configure one or more resources associated with the wireless channel. For example, the serving base stations may receive unsolicited CCA status report(s) during the feedback portions 325 and use this information to perform channel switching, handover, and the like, with respect to the wireless channel.

Figure 4:
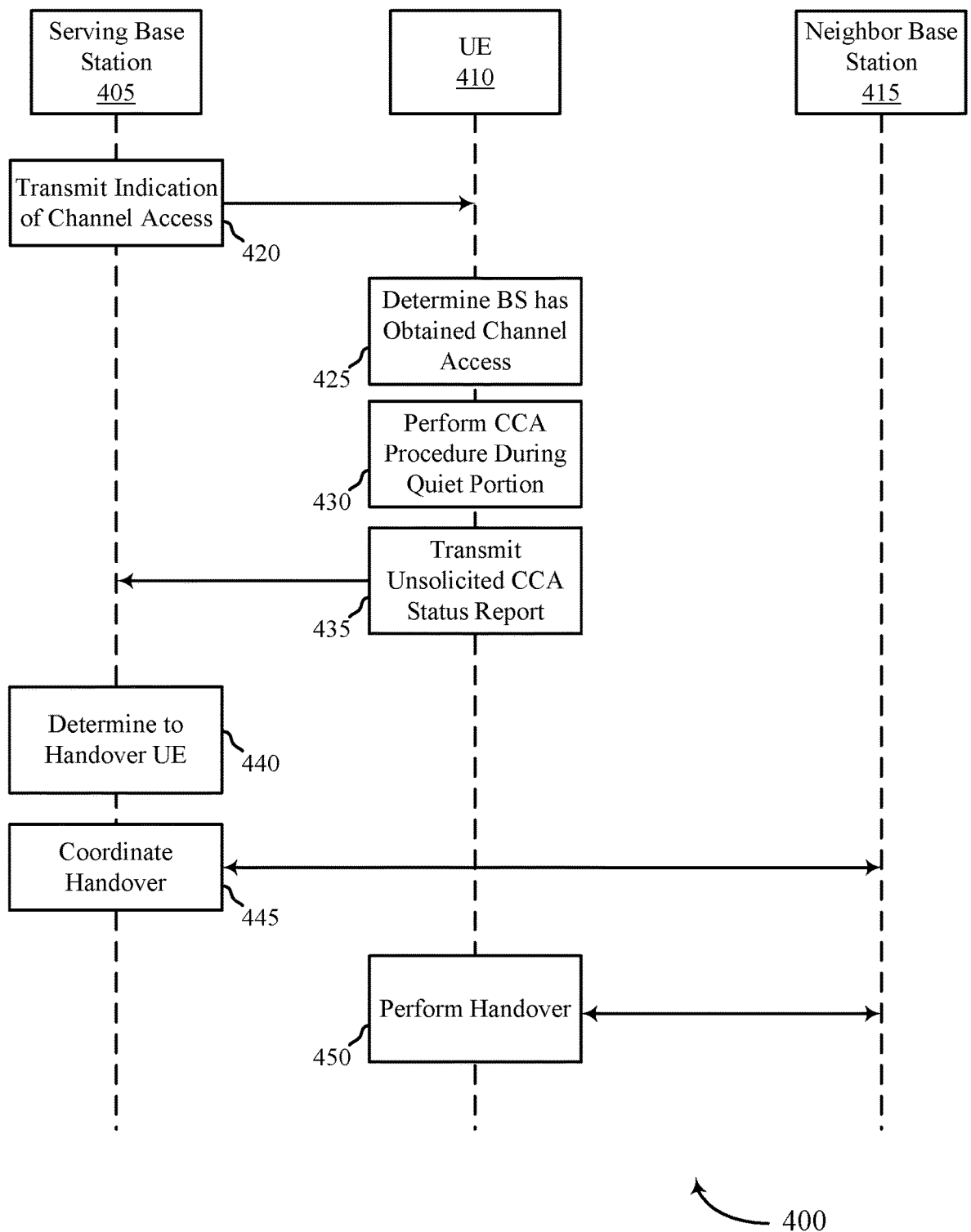
FIG. 4 illustrates an example of a process that supports measurement report on UE CCA status in accordance with aspects of the present disclosure.

FIG. 4 illustrates an example of a process 400 that supports measurement report on UE CCA status in accordance with aspects of the present disclosure. In some examples, process 400 may implement aspects of wireless communication systems 100 and/or 200 and/or timing diagram 300. Aspects of process 400 may be implemented by serving base station 405, UE 410, and/or neighbor base station 415, which may be examples of corresponding devices described herein.

At 420, serving base station 405 may transmit (and UE 410 may receive) an indication that serving base station 405 is obtained access to a wireless channel of the shared radio frequency spectrum band during a TxOP. For example, serving base station 405 may transmit the indication in an RRC signal, a MAC CE, in a control channel, in a DCI, and the like. In some aspects, serving base station 405 may transmit the indication in a broadcast are unicast signal to one or more UEs within his coverage area. For example, the UEs within the coverage area of the serving base station 405 may be configured to monitor for the indication periodically, as needed, and the like. In some aspects, the indication may be transmitted in a RRC message, a MAC CE message, a DCI, and the like. In some aspects, the indication may be transmitted in a request to send message, in a clear to send message, and the like. IN some At 425, UE 410 may determine that serving base station 405 has obtained access to a wireless channel of a shared radio frequency spectrum band during a TxOP. In some aspects, the TxOP is separate from a scheduled uplink transmission by UE 410. That is, UE 410 is not scheduled to communicate during the TxOP. In some aspects, UE 410 may determine that serving base station 405 has obtained access to the wireless channel based at least in part on the indication transmitted by serving base station 405. In some aspects, the indication is transmitted in a broadcast message, unicast message, in a group common control signal, and the like.

At 430, UE 410 may perform a CCA procedure on the wireless channel during a designated quiet portion of the TxOP. For example, a network, base station, etc., may configure the TxOP with one or more designated quiet portions or periods of the TxOP in which devices scheduled to communicate during the TxOP remain silent. This may reduce the noise level present on the channel. The CCA procedure may be an energy detection base CCA procedure and/or a message detection based CCA procedure. The CCA procedure may be a CAT-2 LBT procedure, CAT-4 LBT procedure, and the like.

At 435, UE 410 may transmit (and serving base station 405 may receive) an unsolicited CCA status report (SR). In some aspects, each UE operating within the coverage area of serving base station 405 that are unscheduled for the TxOP may provide unsolicited CCA status reports. The report may carry or otherwise convey an indication of the results of the CCA procedure performed by UE 410. In some aspects, the unsolicited CCA status report may be transmitted at each instance that UE 410 performs a CCA procedure. In some aspects, the unsolicited CCA status report may be transmitted when triggered by serving base station 405. In some aspects, the unsolicited CCA status report may be transmitted when UE 410 determines that a threshold condition has occurred. Examples of the threshold condition include, but are not limited to, a performance metric of the wireless channel falling below a threshold level, a throughput rate of the wireless channel falling below a threshold, an interference level raising above a threshold, and the like. In some aspects, the threshold condition may include a defined number of failed CCA procedures (e.g., based on the failure rate of multiple CCA procedures). In some aspects, the defined number of failed CCA procedures may be within a window (e.g., time period) that triggers transmission of the unsolicited CCA status report.

At 440, serving base station 405 may determines to perform a handover procedure of UE 410 to neighbor base station 415. In some aspects, serving base station 405 may determine to perform the handover based on receipt of the unsolicited CCA status report. In some aspects, serving base station 405 may determine to perform the handover based on the unsolicited CCA status report indicating that the threshold condition has occurred. In some aspects, serving base station 405 may determine to perform the handover based on a request for a handover indicated in the unsolicited CCA status report.

At 445, serving base station 405 and neighbor base station 415 may coordinate the handover of UE 410 from serving base station 405 to neighbor base station 415. In some aspects, this may include one or more messages being exchanged between serving base station 405 and neighbor base station 415. Such messages may be exchanged over a wireline connection (e.g., X2) and/or over a wireless channel. The messages may include an indication of a request for handover, buffered data at serving base station 405 for UE 410, and the like.

At 450, UE 410 may perform the handover to neighbor base station 415. In some aspects, this may include one or more messages being exchanged between UE 410 and neighbor base station 415. Such messages may be exchanged over the wireless channel and/or a different wireless channel. The messages may include an indication of a request for handover, buffered data that neighbor base station 415 received from serving base station 405, and the like.

Figure 5:
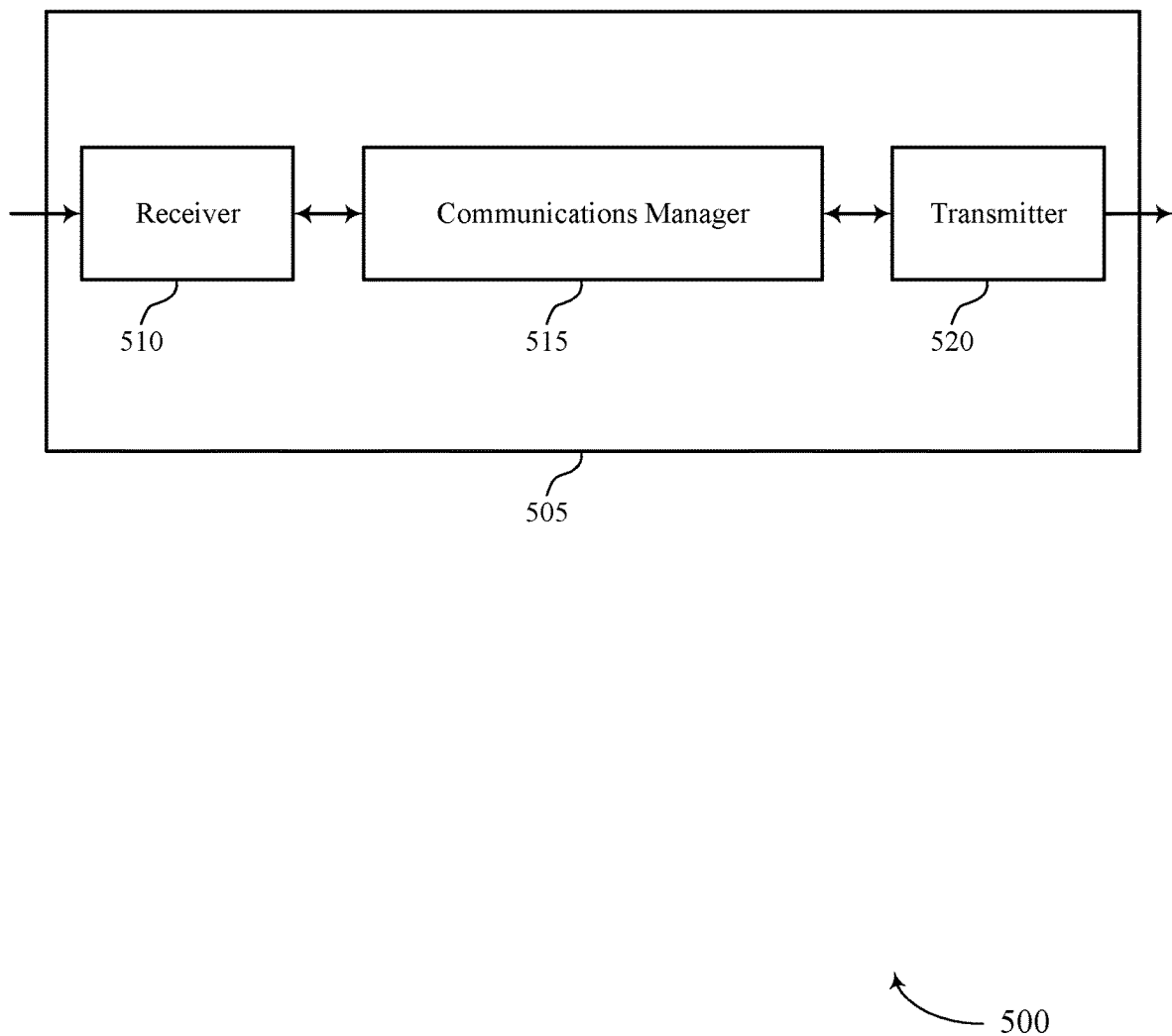
FIGS. 5 and 6 show block diagrams of devices that support measurement report on UE CCA status in accordance with aspects of the present disclosure.

FIG. 5 shows a block diagram 500 of a device 505 that supports measurement report on UE CCA status in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to measurement report on UE CCA status, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine that a serving base station of the UE has obtained access to a wireless channel of a shared radio frequency spectrum band during a TxOP that is separate from a scheduled uplink transmission by the UE, perform, based on the determination, a CCA procedure on the wireless channel during a designated quiet portion of the TxOP, and transmit an unsolicited CCA status report to the serving base station during the TxOP based on the CCA procedure. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
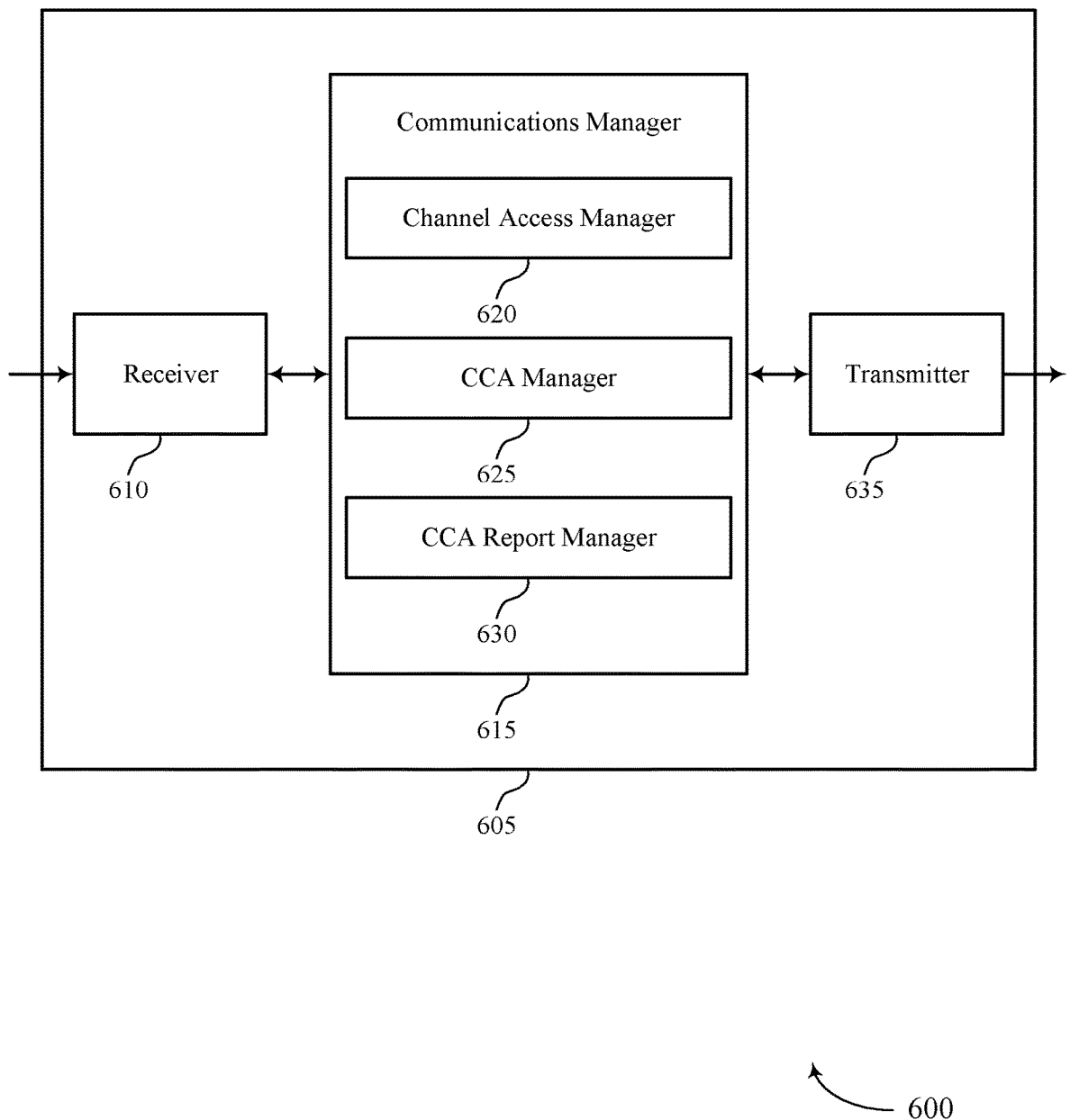

FIG. 6 shows a block diagram 600 of a device 605 that supports measurement report on UE CCA status in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to measurement report on UE CCA status, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a channel access manager 620, a CCA manager 625, and a CCA report manager 630. The communications manager 615 may be an example of aspects of the communications manager 810 described herein.

The channel access manager 620 may determine that a serving base station of the UE has obtained access to a wireless channel of a shared radio frequency spectrum band during a TxOP that is separate from a scheduled uplink transmission by the UE.

The CCA manager 625 may perform, based on the determination, a CCA procedure on the wireless channel during a designated quiet portion of the TxOP.

The CCA report manager 630 may transmit an unsolicited CCA status report to the serving base station during the TxOP based on the CCA procedure.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
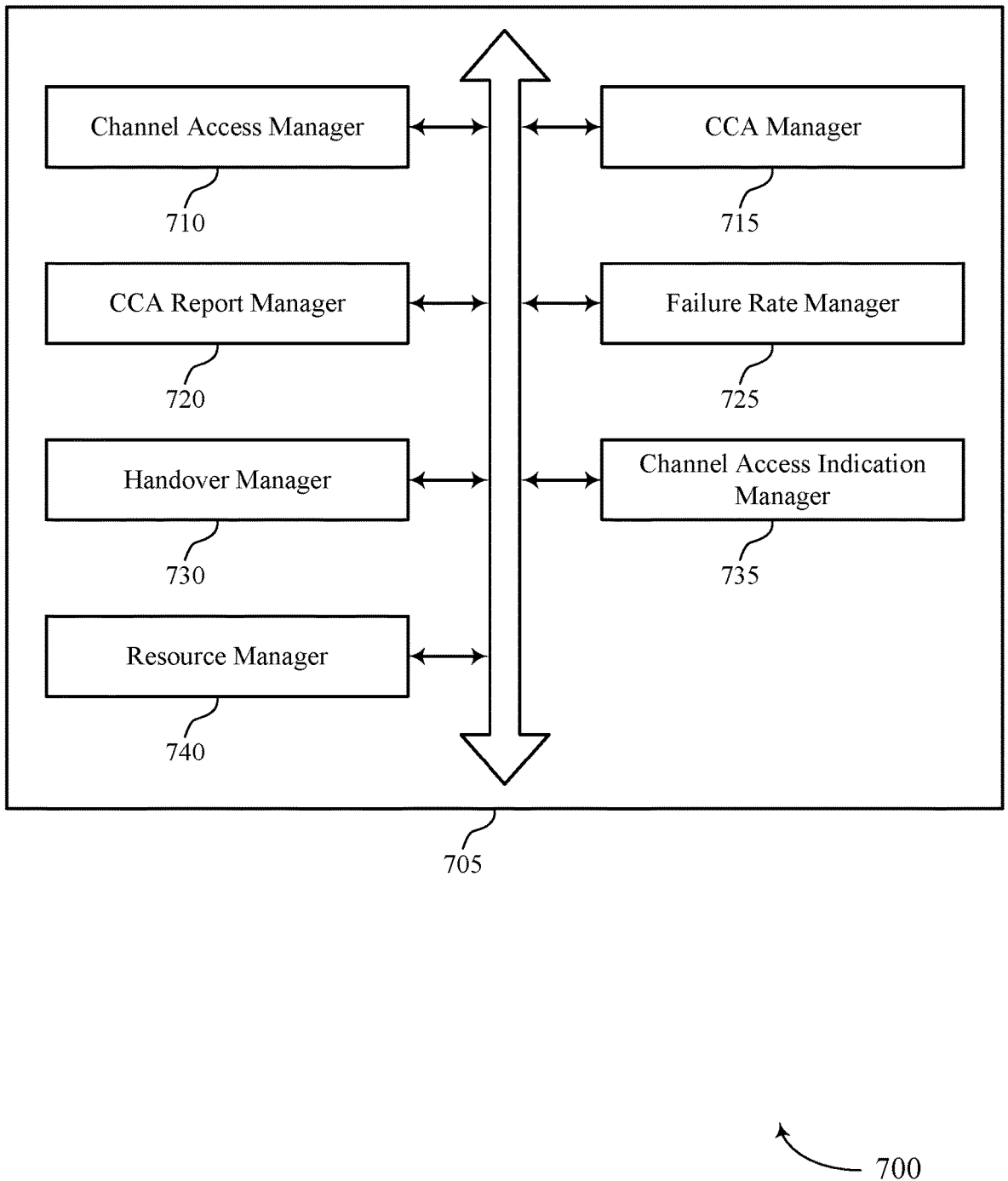
FIG. 7 shows a block diagram of a communications manager that supports measurement report on UE CCA status in accordance with aspects of the present disclosure.

FIG. 7 shows a block diagram 700 of a communications manager 705 that supports measurement report on UE CCA status in accordance with aspects of the present disclosure. The communications manager 705 may be an example of aspects of a communications manager 515, a communications manager 615, or a communications manager 810 described herein. The communications manager 705 may include a channel access manager 710, a CCA manager 715, a CCA report manager 720, a failure rate manager 725, a handover manager 730, a channel access indication manager 735, and a resource manager 740. Each of these modules may communicate, directly or indirectly, with one another (e.g., via one or more buses).

The channel access manager 710 may determine that a serving base station of the UE has obtained access to a wireless channel of a shared radio frequency spectrum band during a TxOP that is separate from a scheduled uplink transmission by the UE. In some examples, the channel access manager 710 may receive from the serving base station an indication that the serving base station has obtained access to the wireless channel. In some cases, a common control signal, a RRC signal, or a downlink control information signal, or a combination thereof.

The CCA manager 715 may perform, based on the determination, a CCA procedure on the wireless channel during a designated quiet portion of the TxOP. In some cases, the CCA procedure is beam-specific. In some cases, the CCA procedure includes either a CAT-4 LBT procedure or a CAT-2 LBT procedure.

The CCA report manager 720 may transmit an unsolicited CCA status report to the serving base station during the TxOP based on the CCA procedure.

The failure rate manager 725 may determine a CCA failure rate over a time period, where the unsolicited CCA status report is based on the failure rate. In some examples, the failure rate manager 725 may trigger the unsolicited CCA status report based on the CCA failure rate over the time period satisfying a threshold.

The handover manager 730 may perform a handover procedure to the non-serving base station based on the unsolicited CCA status report.

The channel access indication manager 735 may receive from the serving base station a preamble to the TxOP, the preamble indicating the designated quiet portion of the TxOP. In some examples, the channel access indication manager 735 may receive a RRC message from the serving base station indicating the designated quiet portion of the TxOP.

The resource manager 740 may receive a signal from the serving base station identifying a resource set for the CCA procedure, where the resource set includes one or more of: a set of one or more resource blocks, a set of one or more frequency subcarriers associated with the channel, the channel of the shared radio frequency spectrum band, or a combination thereof.

Figure 8:
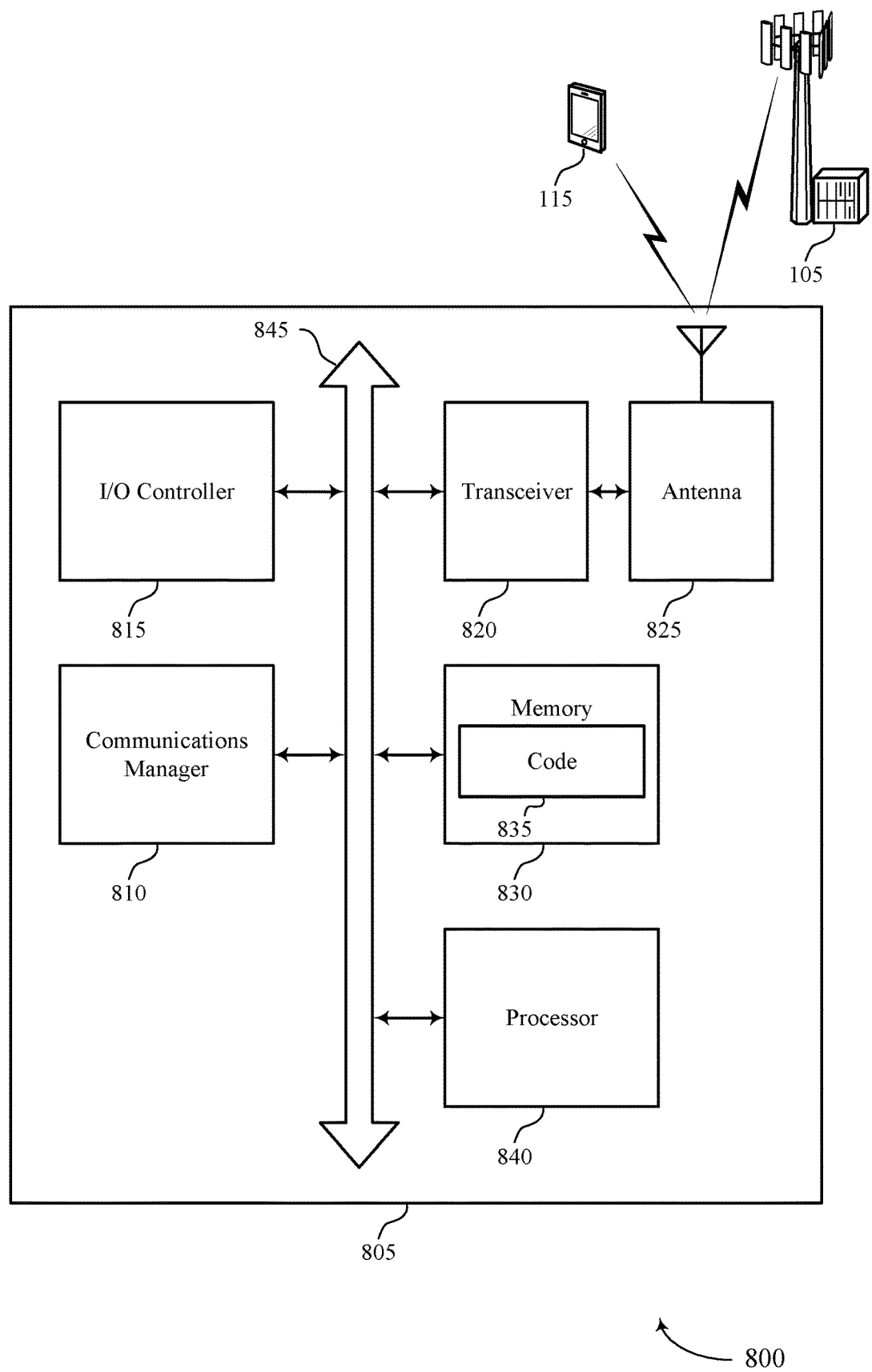
FIG. 8 shows a diagram of a system including a device that supports measurement report on UE CCA status in accordance with aspects of the present disclosure.

FIG. 8 shows a diagram of a system 800 including a device 805 that supports measurement report on UE CCA status in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine that a serving base station of the UE has obtained access to a wireless channel of a shared radio frequency spectrum band during a TxOP that is separate from a scheduled uplink transmission by the UE, perform, based on the determination, a CCA procedure on the wireless channel during a designated quiet portion of the TxOP, and transmit an unsolicited CCA status report to the serving base station during the TxOP based on the CCA procedure.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement report on UE CCA status).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
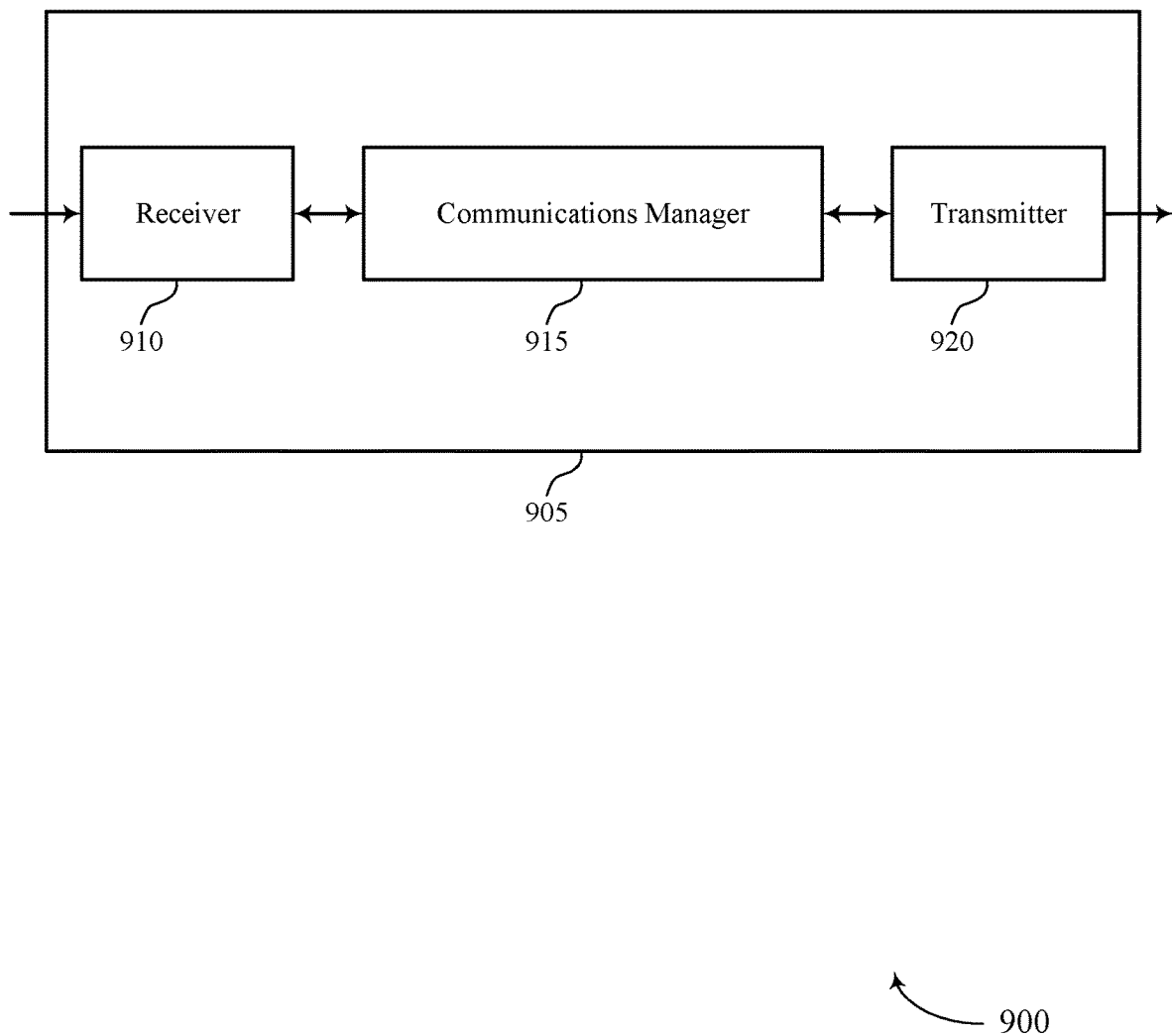
FIGS. 9 and 10 show block diagrams of devices that support measurement report on UE CCA status in accordance with aspects of the present disclosure.

FIG. 9 shows a block diagram 900 of a device 905 that supports measurement report on UE CCA status in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to measurement report on UE CCA status, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit an indication that the serving base station has obtained access to a wireless channel of a shared radio frequency spectrum band during a TxOP, receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP, and configure one or more resources associated with the channel based on the unsolicited CCA status report. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
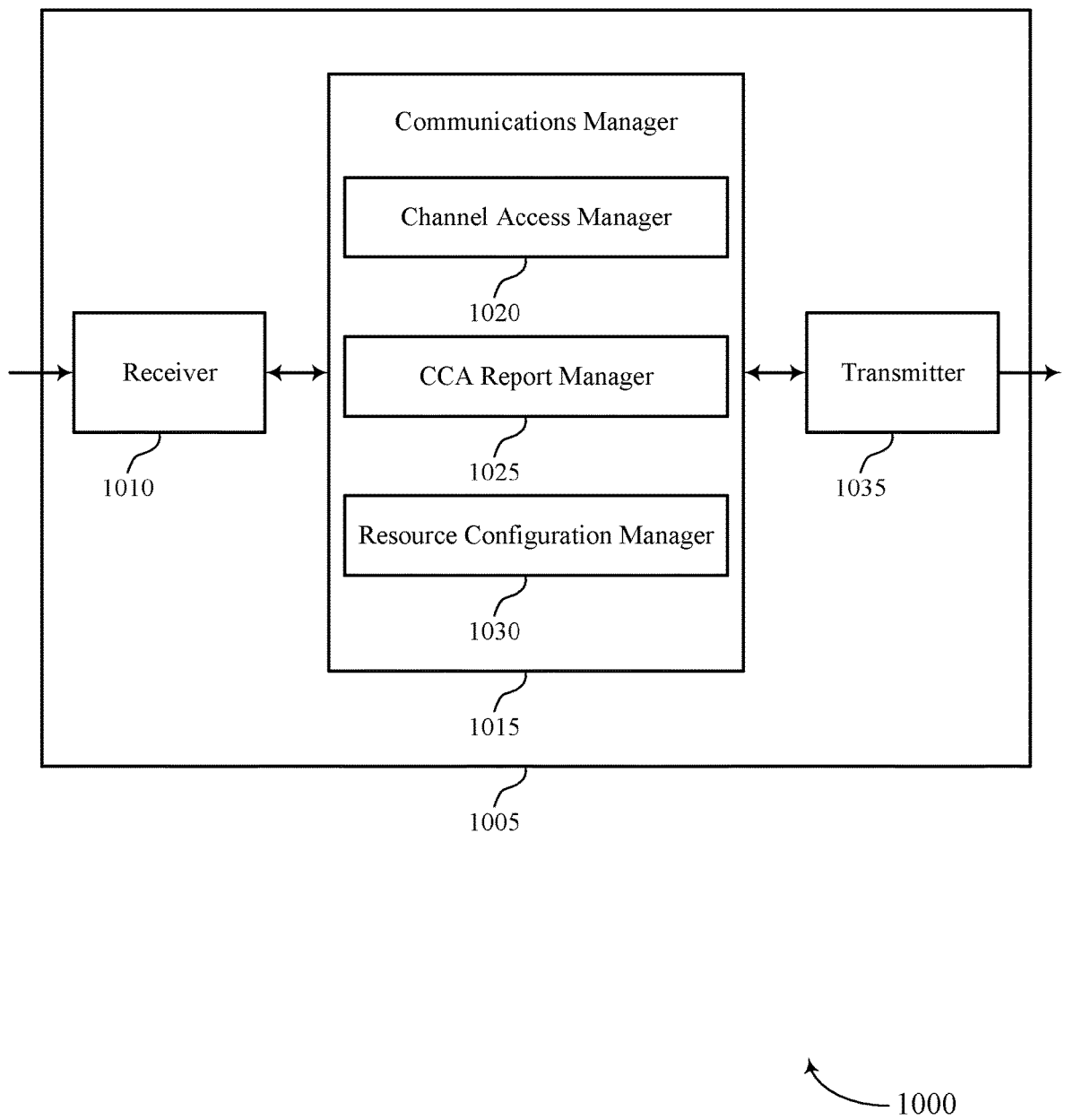

FIG. 10 shows a block diagram 1000 of a device 1005 that supports measurement report on UE CCA status in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement report on UE CCA status, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a channel access manager 1020, a CCA report manager 1025, and a resource configuration manager 1030. The communications manager 1015 may be an example of aspects of the communications manager 1210 described herein.

The channel access manager 1020 may transmit an indication that the serving base station has obtained access to a wireless channel of a shared radio frequency spectrum band during a TxOP.

The CCA report manager 1025 may receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP.

The resource configuration manager 1030 may configure one or more resources associated with the channel based on the unsolicited CCA status report.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
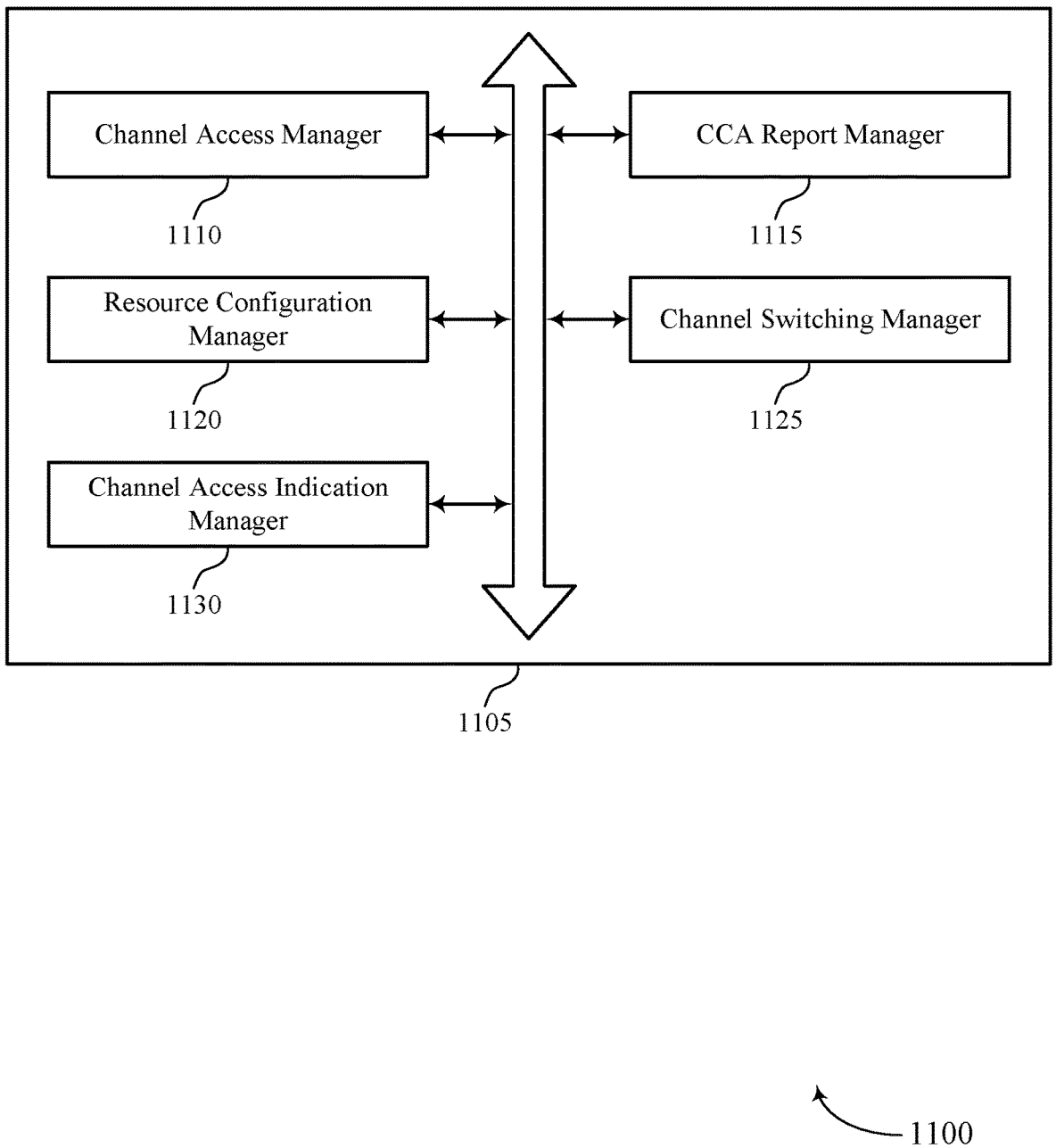
FIG. 11 shows a block diagram of a communications manager that supports measurement report on UE CCA status in accordance with aspects of the present disclosure.

FIG. 11 shows a block diagram 1100 of a communications manager 1105 that supports measurement report on UE CCA status in accordance with aspects of the present disclosure. The communications manager 1105 may be an example of aspects of a communications manager 915, a communications manager 1015, or a communications manager 1210 described herein. The communications manager 1105 may include a channel access manager 1110, a CCA report manager 1115, a resource configuration manager 1120, a channel switching manager 1125, and a channel access indication manager 1130. Each of these modules may communicate, directly or indirectly, with one another (e.g., via one or more buses).

The channel access manager 1110 may transmit an indication that the serving base station has obtained access to a wireless channel of a shared radio frequency spectrum band during a TxOP.

The CCA report manager 1115 may receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP. In some cases, the CCA procedure is beam-specific.

The resource configuration manager 1120 may configure one or more resources associated with the channel based on the unsolicited CCA status report. In some examples, the resource configuration manager 1120 may schedule a set of UEs for uplink transmissions using a same set of one or more resources based on the unsolicited CCA status report.

The channel switching manager 1125 may perform channel switching based on the unsolicited CCA status report. In some examples, the channel switching manager 1125 may determine, based on the unsolicited CCA status report, that a failure rate for a set of CCA procedures performed by the UE satisfies a threshold level, where the channel switching is performed based on failure rate satisfying the threshold level.

The channel access indication manager 1130 may transmit to the UE an indication of a resource set for the CCA procedure, where the resource set includes one or more of: a set of one or more resource blocks, or a set of one or more frequency subcarriers associated with the channel, or the channel of the shared radio frequency spectrum band, or a combination thereof. In some cases, a common control signal, a RRC signal, a downlink control information signal, or a combination thereof.

Figure 12:
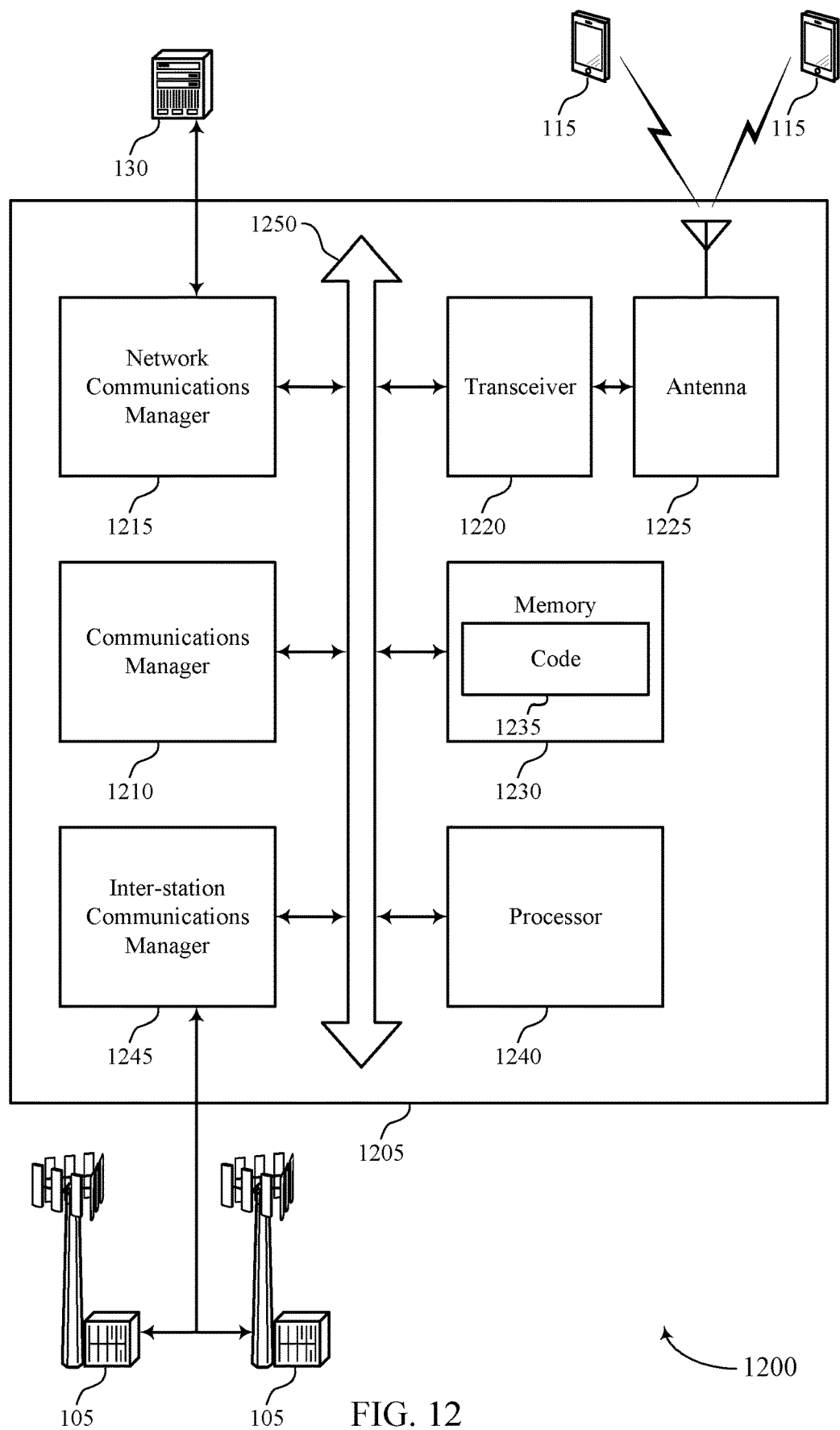
FIG. 12 shows a diagram of a system including a device that supports measurement report on UE CCA status in accordance with aspects of the present disclosure.

FIG. 12 shows a diagram of a system 1200 including a device 1205 that supports measurement report on UE CCA status in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit an indication that the serving base station has obtained access to a wireless channel of a shared radio frequency spectrum band during a TxOP, receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP, and configure one or more resources associated with the channel based on the unsolicited CCA status report.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting measurement report on UE CCA status).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
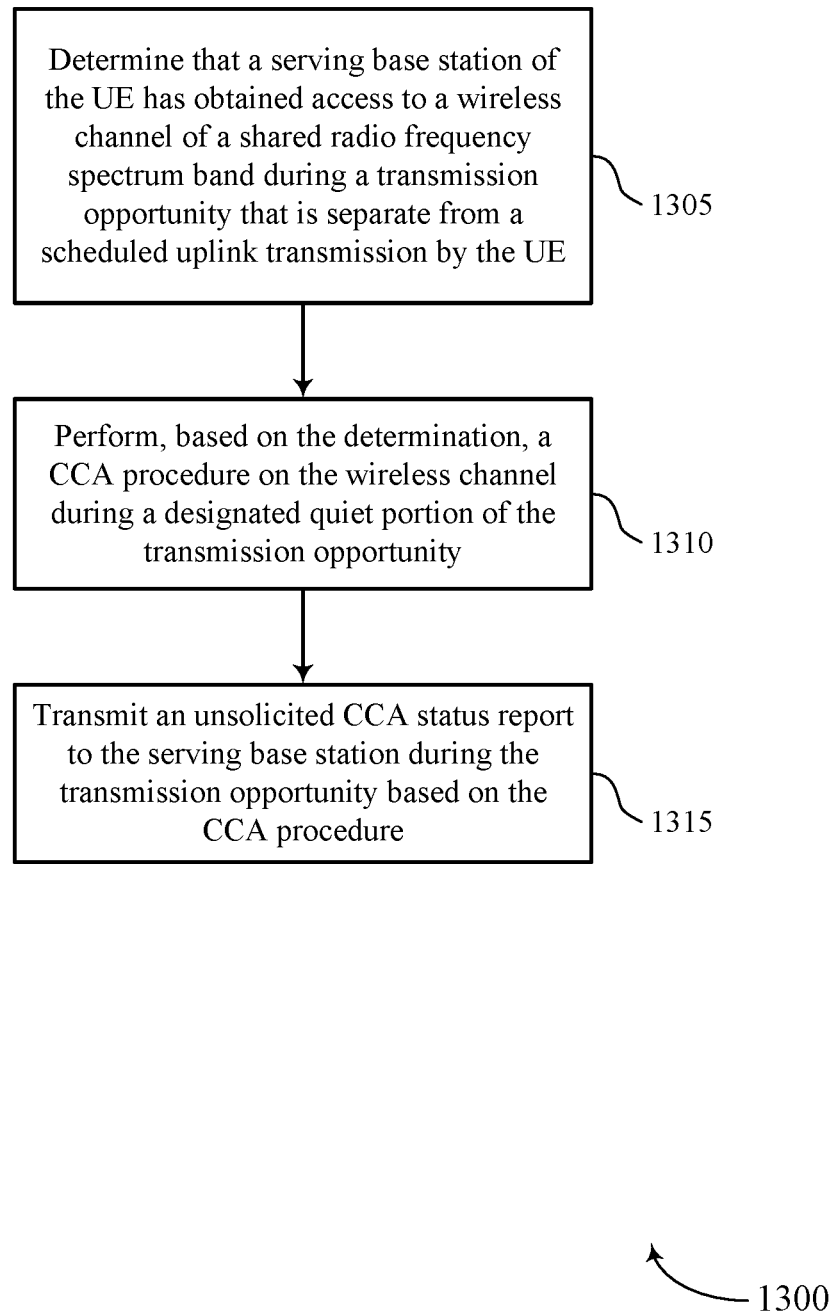
FIGS. 13 through 16 show flowcharts illustrating methods that support measurement report on UE CCA status in accordance with aspects of the present disclosure.

FIG. 13 shows a flowchart illustrating a method 1300 that supports measurement report on UE CCA status in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine that a serving base station of the UE has obtained access to a wireless channel of a shared radio frequency spectrum band during a TxOP that is separate from a scheduled uplink transmission by the UE. The operations of 1305 may be performed according to the methods described herein. In some examples, aspects of the operations of 1305 may be performed by a channel access manager as described with reference to FIGS. 5 through 8.

At 1310, the UE may perform, based on the determination, a CCA procedure on the wireless channel during a designated quiet portion of the TxOP. The operations of 1310 may be performed according to the methods described herein. In some examples, aspects of the operations of 1310 may be performed by a CCA manager as described with reference to FIGS. 5 through 8.

At 1315, the UE may transmit an unsolicited CCA status report to the serving base station during the TxOP based on the CCA procedure. The operations of 1315 may be performed according to the methods described herein. In some examples, aspects of the operations of 1315 may be performed by a CCA report manager as described with reference to FIGS. 5 through 8.

Figure 14:
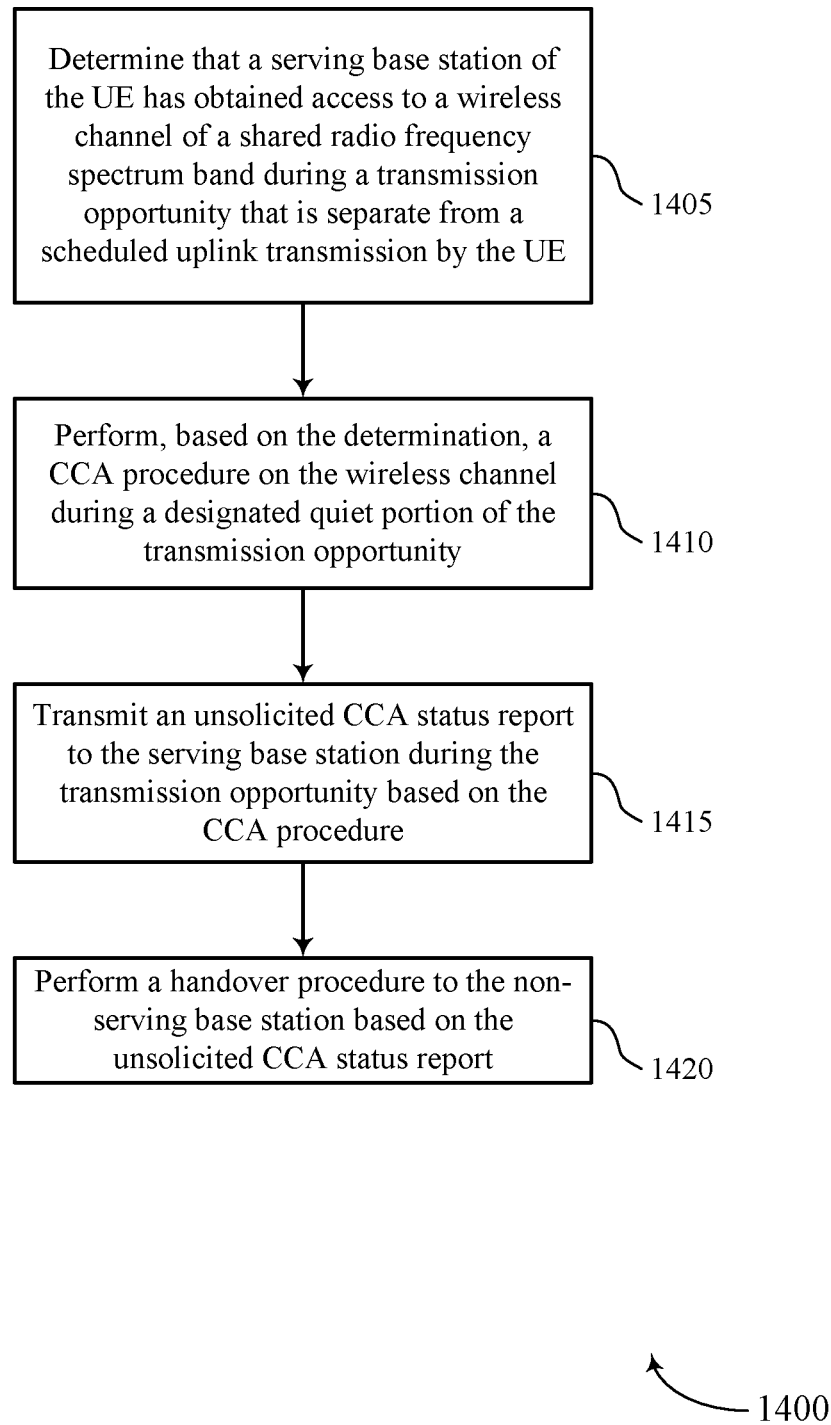

FIG. 14 shows a flowchart illustrating a method 1400 that supports measurement report on UE CCA status in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine that a serving base station of the UE has obtained access to a wireless channel of a shared radio frequency spectrum band during a TxOP that is separate from a scheduled uplink transmission by the UE. The operations of 1405 may be performed according to the methods described herein. In some examples, aspects of the operations of 1405 may be performed by a channel access manager as described with reference to FIGS. 5 through 8.

At 1410, the UE may perform, based on the determination, a CCA procedure on the wireless channel during a designated quiet portion of the TxOP. The operations of 1410 may be performed according to the methods described herein. In some examples, aspects of the operations of 1410 may be performed by a CCA manager as described with reference to FIGS. 5 through 8.

At 1415, the UE may transmit an unsolicited CCA status report to the serving base station during the TxOP based on the CCA procedure. The operations of 1415 may be performed according to the methods described herein. In some examples, aspects of the operations of 1415 may be performed by a CCA report manager as described with reference to FIGS. 5 through 8.

At 1420, the UE may perform a handover procedure to the non-serving base station based on the unsolicited CCA status report. The operations of 1420 may be performed according to the methods described herein. In some examples, aspects of the operations of 1420 may be performed by a handover manager as described with reference to FIGS. 5 through 8.

Figure 15:
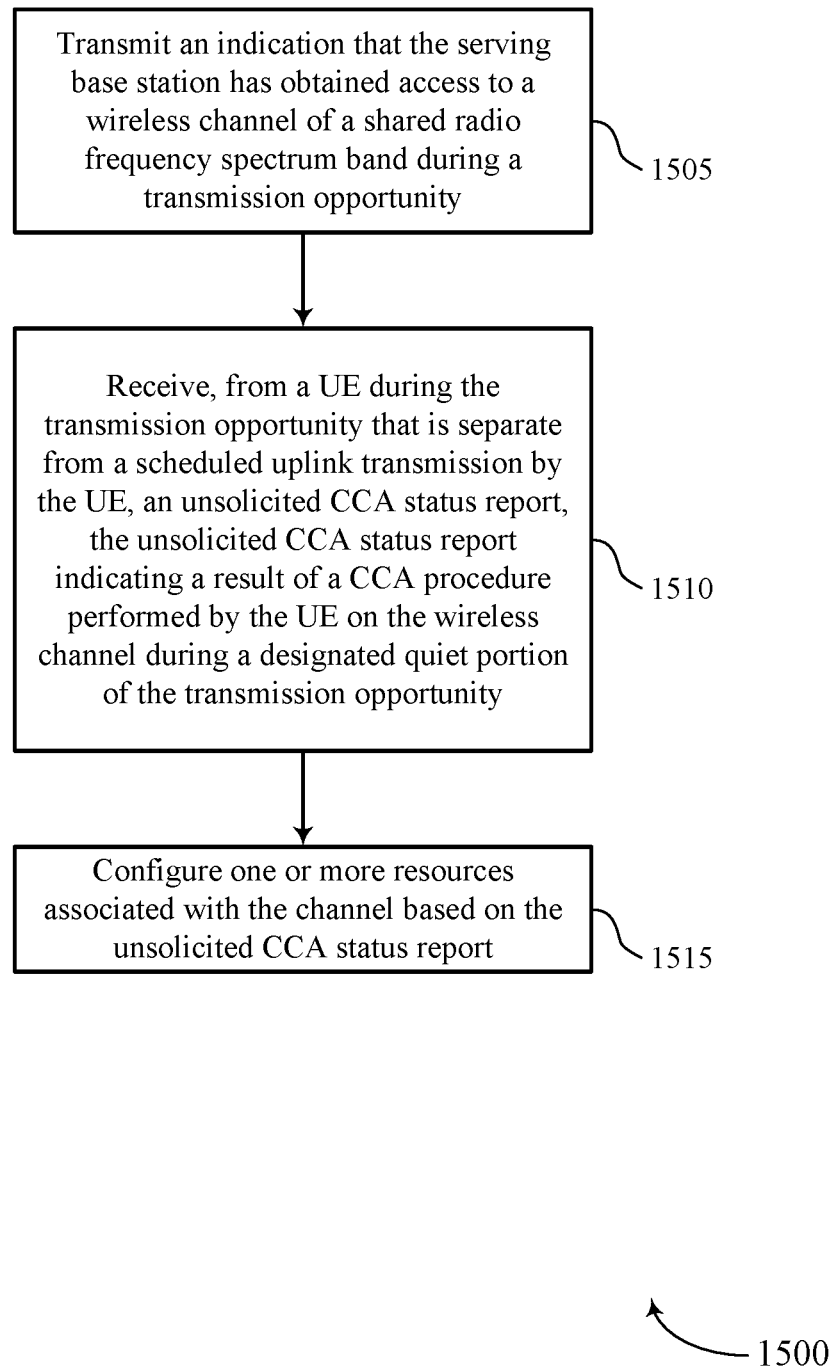

FIG. 15 shows a flowchart illustrating a method 1500 that supports measurement report on UE CCA status in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit an indication that the serving base station has obtained access to a wireless channel of a shared radio frequency spectrum band during a TxOP. The operations of 1505 may be performed according to the methods described herein. In some examples, aspects of the operations of 1505 may be performed by a channel access manager as described with reference to FIGS. 9 through 12.

At 1510, the base station may receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP. The operations of 1510 may be performed according to the methods described herein. In some examples, aspects of the operations of 1510 may be performed by a CCA report manager as described with reference to FIGS. 9 through 12.

At 1515, the base station may configure one or more resources associated with the channel based on the unsolicited CCA status report. The operations of 1515 may be performed according to the methods described herein. In some examples, aspects of the operations of 1515 may be performed by a resource configuration manager as described with reference to FIGS. 9 through 12.

Figure 16:
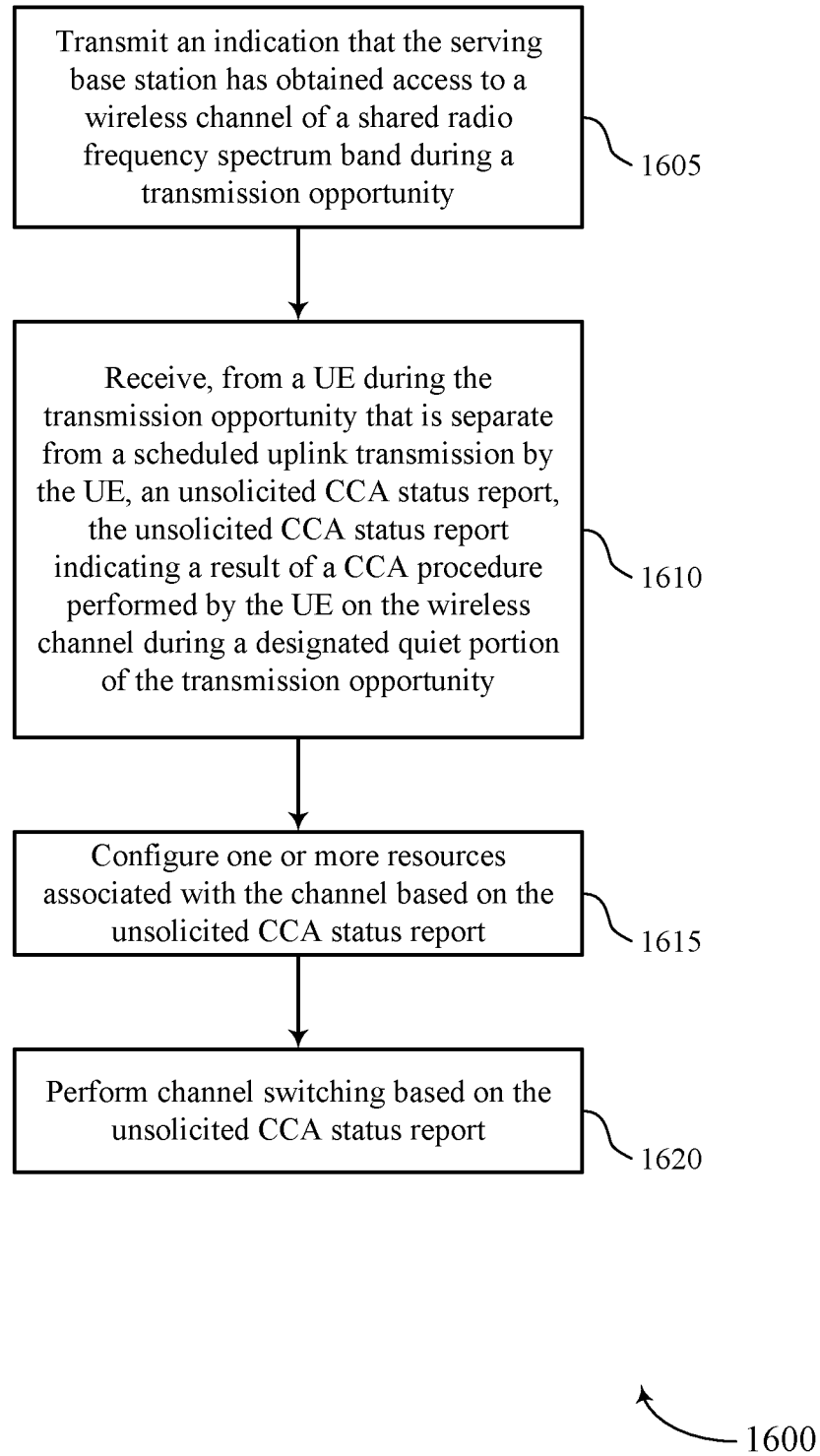

FIG. 16 shows a flowchart illustrating a method 1600 that supports measurement report on UE CCA status in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit an indication that the serving base station has obtained access to a wireless channel of a shared radio frequency spectrum band during a TxOP. The operations of 1605 may be performed according to the methods described herein. In some examples, aspects of the operations of 1605 may be performed by a channel access manager as described with reference to FIGS. 9 through 12.

At 1610, the base station may receive, from a UE during the TxOP that is separate from a scheduled uplink transmission by the UE, an unsolicited CCA status report, the unsolicited CCA status report indicating a result of a CCA procedure performed by the UE on the wireless channel during a designated quiet portion of the TxOP. The operations of 1610 may be performed according to the methods described herein. In some examples, aspects of the operations of 1610 may be performed by a CCA report manager as described with reference to FIGS. 9 through 12.

At 1615, the base station may configure one or more resources associated with the channel based on the unsolicited CCA status report. The operations of 1615 may be performed according to the methods described herein. In some examples, aspects of the operations of 1615 may be performed by a resource configuration manager as described with reference to FIGS. 9 through 12.

At 1620, the base station may perform channel switching based on the unsolicited CCA status report. The operations of 1620 may be performed according to the methods described herein. In some examples, aspects of the operations of 1620 may be performed by a channel switching manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining that a serving base station of the UE has obtained access to a wireless channel of a shared radio frequency spectrum band during a transmission opportunity, wherein communications for the UE are unscheduled during the transmission opportunity;
   performing, based at least in part on the determination, a clear channel assessment (CCA) procedure on the wireless channel during a designated quiet portion of the transmission opportunity; and
   transmitting an unsolicited CCA status report to the serving base station during the transmission opportunity based at least in part on the CCA procedure.

2. The method of claim 1, further comprising:
   determining a CCA failure rate for the UE over a time period, wherein transmitting the unsolicited CCA status report is based at least in part on the CCA failure rate for the UE.

3. The method of claim 2, further comprising:
   triggering the unsolicited CCA status report based at least in part on the CCA failure rate for the UE over the time period satisfying a threshold.

4. The method of claim 1, wherein determining that the serving base station of the UE has obtained access to the wireless channel comprises:
   receiving from the serving base station an indication that the serving base station has obtained access to the wireless channel.

5. The method of claim 4, wherein the indication that the serving base station has obtained access to the wireless channel is received in one or more of: a common control signal, a radio resource control (RRC) signal, or a downlink control information signal, or a combination thereof.

6. The method of claim 1, further comprising:
   performing a handover procedure to a non-serving base station based at least in part on the unsolicited CCA status report.

7. The method of claim 1, further comprising:
   receiving from the serving base station a preamble to the transmission opportunity, the preamble indicating the designated quiet portion of the transmission opportunity.

8. The method of claim 1, further comprising:
   receiving a radio resource control (RRC) message from the serving base station indicating the designated quiet portion of the transmission opportunity.

9. The method of claim 1, wherein the CCA procedure is beam-specific.

10. The method of claim 1, further comprising:
    receiving a signal from the serving base station identifying a resource set for the CCA procedure, wherein the resource set comprises one or more of: a set of one or more resource blocks, a set of one or more frequency subcarriers associated with the wireless channel, the wireless channel of the shared radio frequency spectrum band, or a combination thereof.

11. The method of claim 1, wherein the CCA procedure comprises either a category four (CAT-4) listen-before-talk (LBT) procedure or a CAT-2 LBT procedure.

12. The method of claim 1, further comprising:
    determining that a non-serving base station has obtained access to the wireless channel of during a transmission opportunity of the non-serving base station; and
    performing the CCA procedure on the wireless channel based at least in part on determining that the non-serving base station has obtained access to the wireless channel of during the transmission opportunity of the non-serving base station.

13. The method of claim 12, further comprising:
    receiving, from the serving base station, a radio resource control (RRC) message, wherein determining that the non-serving base station has obtained access to the wireless channel is based at least in part on the RRC message.

14. The method of claim 13, wherein the RRC message indicates how to identify the transmission opportunity of the non-serving base station.

15. The method of claim 13, wherein the RRC message is determined through coordination between the serving base station and the non-serving base station.

16. The method of claim 13, wherein the RRC message indicates a preamble to the transmission opportunity of the non-serving base station.

17. The method of claim 13, wherein the RRC message indicates the designated quiet portion of the transmission opportunity of the non-serving base station.

18. The method of claim 13, wherein the RRC message indicates a discovery reference signal (DRS) window of the non-serving base station during which the CCA procedure is to be performed on the wireless channel.

19. A method for wireless communication at a serving base station, comprising:
    transmitting an indication that the serving base station has obtained access to a wireless channel of a shared radio frequency spectrum band during a transmission opportunity;
    receiving, from a user equipment (UE) during the transmission opportunity, an unsolicited clear channel assessment (CCA) status report, the unsolicited CCA status report indicating a result of a CCA procedure performed by the UE on the wireless channel during a designated quiet portion of the transmission opportunity, wherein communications for the UE are unscheduled during the transmission opportunity; and
    configuring one or more resources associated with the wireless channel based at least in part on the unsolicited CCA status report.

20. The method of claim 19, further comprising:
    performing channel switching based at least in part on the unsolicited CCA status report.

21. The method of claim 20, further comprising:
    determining, based at least in part on the unsolicited CCA status report, that a failure rate for a plurality of CCA procedures performed by the UE satisfies a threshold level, wherein the channel switching is performed based at least in part on the failure rate satisfying the threshold level.

22. The method of claim 19, wherein the indication that the serving base station has obtained access to the wireless channel is transmitted in one or more of: a common control signal, a radio resource control (RRC) signal, a downlink control information signal, or a combination thereof.

23. The method of claim 19, wherein the CCA procedure is beam-specific.

24. The method of claim 19, wherein:
transmitting to the UE an indication of a resource set for the CCA procedure, wherein the resource set comprises one or more of: a set of one or more resource blocks, or a set of one or more frequency subcarriers associated with the wireless channel, or the wireless channel of the shared radio frequency spectrum band, or a combination thereof.

25. The method of claim 19, wherein configuring the one or more resources associated with the wireless channel comprises:
scheduling a plurality of UEs for uplink transmissions using a same set of one or more resources based at least in part on the unsolicited CCA status report.

26. An apparatus for wireless communication at a user equipment (UE), comprising: a processor, memory in electronic communication with the processor; and instructions stored in the memory and executable by the processor to cause the apparatus to:
determine that a serving base station of the UE has obtained access to a wireless channel of a shared radio frequency spectrum band during a transmission opportunity, wherein communications for the UE are unscheduled during the transmission opportunity;
perform, based at least in part on the determination, a clear channel assessment (CCA) procedure on the wireless channel during a designated quiet portion of the transmission opportunity; and
transmit an unsolicited CCA status report to the serving base station during the transmission opportunity based at least in part on the CCA procedure.

27. The apparatus of claim 26, wherein the instructions are further executable by the processor to cause the apparatus to:
determine a CCA failure rate for the UE over a time period, wherein transmitting the unsolicited CCA status report is based at least in part on the CCA failure rate for the UE.

28. The apparatus of claim 27, wherein the instructions are further executable by the processor to cause the apparatus to:
trigger the unsolicited CCA status report based at least in part on the CCA failure rate for the UE over the time period satisfying a threshold.

29. The apparatus of claim 27, wherein the instructions executable by the processor to cause the apparatus to determine that the serving base station of the UE has obtained access to the wireless channel comprise instructions executable by the processor to:
receive from the serving base station an indication that the serving base station has obtained access to the wireless channel.

30. A non-transitory computer-readable medium storing code for wireless communication at a user equipment (UE), the code comprising instructions executable to:
determine that a serving base station of the UE has obtained access to a wireless channel of a shared radio frequency spectrum band during a transmission opportunity, wherein communications for the UE are unscheduled during the transmission opportunity;
perform, based at least in part on the determination, a clear channel assessment (CCA) procedure on the wireless channel during a designated quiet portion of the transmission opportunity; and
transmit an unsolicited CCA status report to the serving base station during the transmission opportunity based at least in part on the CCA procedure.

* * * * *